(12) United States Patent
Kuboyama

(10) Patent No.: US 9,756,265 B2
(45) Date of Patent: Sep. 5, 2017

(54) INFORMATION PROCESSING APPARATUS RECOGNIZING CERTAIN OBJECT IN CAPTURED IMAGE, AND METHOD FOR CONTROLLING THE SAME

(71) Applicant: CANON KABUSHIKI KAISHA, Tokyo (JP)

(72) Inventor: Hideo Kuboyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 14/750,986

(22) Filed: Jun. 25, 2015

(65) Prior Publication Data

US 2016/0012599 A1 Jan. 14, 2016

(30) Foreign Application Priority Data

Jul. 9, 2014 (JP) .................................. 2014-141806

(51) Int. Cl.
*H04N 7/18* (2006.01)
*H04N 5/335* (2011.01)
*G06F 3/01* (2006.01)
*G06F 3/0346* (2013.01)
(Continued)

(52) U.S. Cl.
CPC ........... *H04N 5/3355* (2013.01); *G06F 3/017* (2013.01); *G06F 3/0346* (2013.01); *G06K 9/00355* (2013.01); *H04N 5/23212* (2013.01)

(58) Field of Classification Search
CPC ....... G01B 11/022; G06T 7/60; G06F 3/0425; G06F 3/042; G06F 3/0426; G06F 3/0304; G06F 3/017; G06F 3/0346; H04N 7/18; H04N 7/183; H04N 9/3141; H04N 9/3176;
(Continued)

(56) References Cited

U.S. PATENT DOCUMENTS 5,844,547 A * 12/1998 Minakuchi ............ G06F 3/0481
345/156
8,837,780 B2 9/2014 Jia
(Continued)

FOREIGN PATENT DOCUMENTS

EP 2175351 A2 4/2010
JP 2013-257686 A 12/2013

*Primary Examiner* — Lin Ye
*Assistant Examiner* — Euel Cowan
(74) *Attorney, Agent, or Firm* — Canon U.S.A., Inc. IP Division

(57) ABSTRACT

An information processing apparatus includes an image obtaining unit configured to obtain an input image, an extraction unit configured to extract from the input image one or more regions corresponding to one or more objects included in a foreground of the operation surface in accordance with the reflected positional information and positional information of the operation surface in the space, a region specifying unit configured to specify an isolation region, which is not in contact with a boundary line which defines a predetermined closed region in the input image, from among the one or more regions extracted by the extraction unit, and a recognition unit configured to recognize an adjacency state of a predetermined instruction object relative to the operation surface in accordance with the positional information reflected from the portion corresponding to the isolation region as specified by the region specifying unit.

19 Claims, 16 Drawing Sheets

(51) Int. Cl.
*H04N 5/232* (2006.01)
*G06K 9/00* (2006.01)

(58) Field of Classification Search
CPC ............. H04N 5/3355; H04N 5/23212; G06K 9/00355
USPC ... 348/61, 77, 143, 154, 155, 159, 169–172; 382/164, 165, 291
See application file for complete search history.

(56) References Cited

U.S. PATENT DOCUMENTS

| | | | | |
|---|---|---|---|---|
| 2003/0052991 | A1* | 3/2003 | Stavely | H04N 5/232 348/370 |
| 2008/0240523 | A1* | 10/2008 | Benkley | G06K 9/00026 382/126 |
| 2013/0004082 | A1* | 1/2013 | Kano | G06T 5/002 382/195 |
| 2013/0307949 | A1* | 11/2013 | Zhang | G06F 3/042 348/61 |
| 2014/0185872 | A1* | 7/2014 | Kim | G06K 9/00355 382/103 |
| 2014/0204018 | A1* | 7/2014 | Murase | G06F 3/0426 345/156 |
| 2014/0306889 | A1* | 10/2014 | Kresl | G06F 3/033 345/157 |

* cited by examiner

INPUT IMAGE

DETECTED MOVEMENT REGION

607

RANGE IMAGE OF ISOLATED REGION

BACKGROUND IMAGE IN INITIAL STATE

SYNTHESIZED BACKGROUND IMAGE

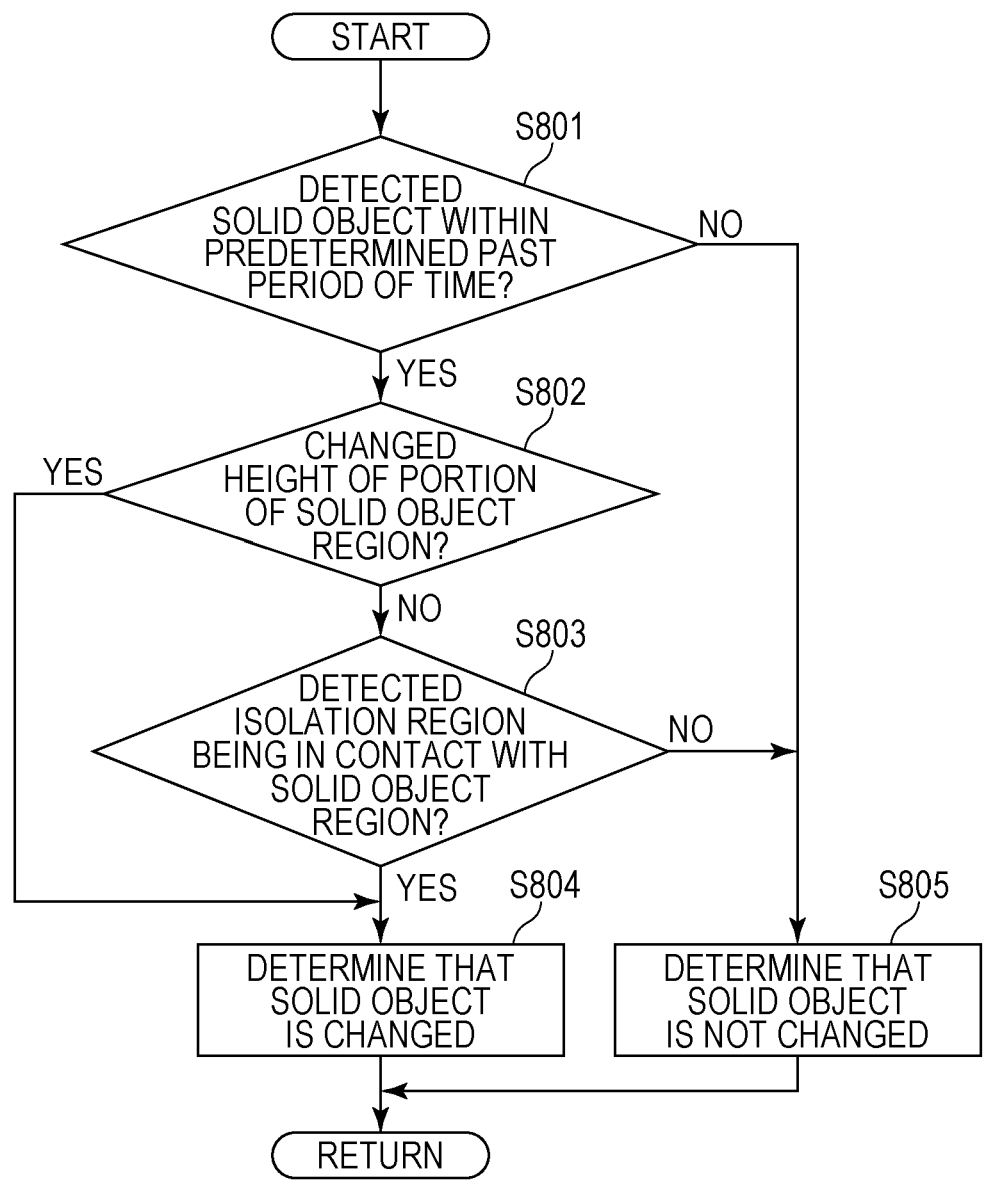

INPUT IMAGE 1601  1602  1603

CORRECTED IMAGE

1604

INFORMATION PROCESSING APPARATUS RECOGNIZING CERTAIN OBJECT IN CAPTURED IMAGE, AND METHOD FOR CONTROLLING THE SAME

BACKGROUND OF THE INVENTION

Field of the Invention

The present invention relates to a technique of detecting a user's operation with reference to a movement region extracted from an image.

Description of the Related Art

A technique of extracting a region including an image of a specific object, such as a user's hand, from an image obtained by a visible light camera, an infrared camera, or a range image sensor and recognizing a UI (User Interface) operation by a gesture in accordance with a movement and a position of the object has widely used. A technique of recognizing an operation by measurement of a three-dimensional position of an object instead of detection of a touch on a touch panel has been used for tabletop interfaces which display images and UIs on table surfaces and operate the images and UIs by touching.

Japanese Patent Laid-Open No. 2013-257686 discloses a system which detects a user's hand in accordance with a difference between frames in a video image captured by a camera and which recognizes a gesture operation performed on a projected UI component.

To detect a touch of an object on a touch target surface in accordance with measurement of a three-dimensional position, a distance between the touch target surface and the object may be measured and a state in which the distance is smaller than a predetermined threshold value may be determined as a state in which the touch target surface is touched.

SUMMARY OF THE INVENTION

The present invention provides an information processing apparatus including an image obtaining unit configured to obtain an input image on which positional information in a space including an operation surface as a portion of a background is reflected, an extraction unit configured to extract one or more regions corresponding to one or more objects included in a foreground of the operation surface from the input image in accordance with the positional information reflected on the input image obtained by the image obtaining unit and positional information of the operation surface in the space, a region specifying unit configured to specify an isolation region which is not in contact with a boundary line which defines a predetermined closed region in the input image from among the one or more regions extracted by the extraction unit, and a recognition unit configured to recognizes an adjacency state of a predetermined instruction object relative to the operation surface in accordance with the positional information reflected on the isolation region in the input image in a portion corresponding to the isolation region specified by the region specifying unit.

Further features of the present invention will become apparent from the following description of exemplary embodiments with reference to the attached drawings.

BRIEF DESCRIPTION OF THE DRAWING

FIG. 8 is a flowchart illustrating a process of determining a change of an isolation region executed by the image processing apparatus according to the first embodiment.

DESCRIPTION OF THE EMBODIMENTS

As one of advantages of a system which recognizes an operation by three-dimensional measurement, a surface settable as a target of a touch operation is not limited to a surface of a touch panel. Specifically, a touch on an arbitrary wall surface or a surface of a solid object mounted on a table may be detected and recognized as an operation. However, when a solid object is mounted or moved in a table, a three-dimensional shape of a touch target surface is deformed, and therefore, three-dimensional positional information is required to be updated. To explicitly instruct update of three-dimensional positional information to a system every time deformation occurs is troublesome for a user.

To address the problem described above, according to the present invention, three-dimensional positional information on an operation target surface is updated in accordance with a user's operation in a system in which the operation target surface may be deformed.

Hereinafter, information processes according to embodiments of the present invention will be described in detail with reference to the accompanying drawings. Note that configurations described in the embodiments are merely examples, and the present invention is not limited to these configurations.

Figure 1A:
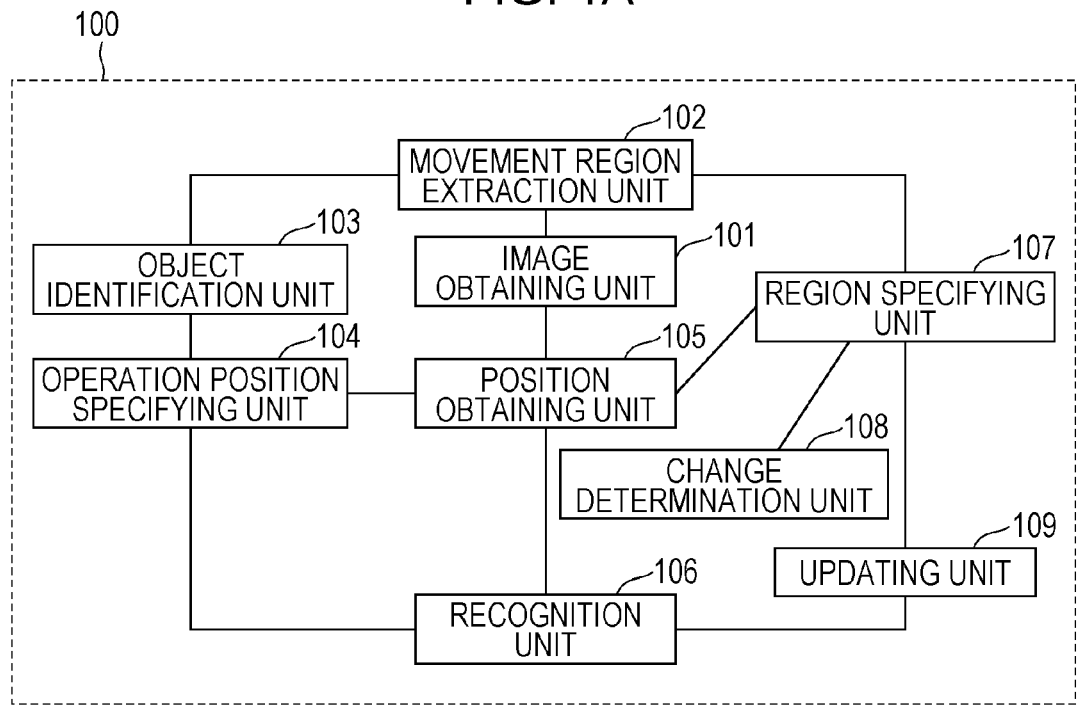
FIGS. 1A and 1B are block diagrams illustrating a functional configuration and a hardware configuration of an image processing apparatus according to a first embodiment, respectively.

FIG. 1A is a diagram illustrating a functional configuration of an image processing apparatus 100 according to a first embodiment.

An image obtaining unit 101 obtains a range image captured by a range image sensor 116 as an input image. A movement region extraction unit 102 extracts a region including an image of a moving object from the input image obtained by the image obtaining unit 101 as a movement region. It is estimated that the moving object at least includes an object used for input of a gesture operation, such as a user's hand. When a user holds an object, such as a book or a sheet, a range of an image including the user's hand and the object, such as a book or a sheet, is extracted as a movement region.

An object identification unit 103 determines whether the movement region extracted by the movement region extraction unit 102 is a predetermined recognition target. In this embodiment, the user's hand used for the gesture operation is identified as a predetermined recognition target. However, this embodiment is also applicable to a case where a portion of a body other than the hand, a stylus, or the like is used as an instruction object instead of the user's hand. An operation position specifying unit 104 specifies an operation position instructed by the instruction object. In this embodiment, the operation position specifying unit 104 specifies a position of a fingertip of the user. A position obtaining unit 105 converts information obtained from pixels in the input image into positional information in a three-dimensional coordinate space. A recognition unit 106 recognizes an instruction issued by the user input using the instruction object in accordance with a three-dimensional position obtained by the position obtaining unit 105. The recognition unit 106 of this embodiment at least detects a touch operation on an operation surface performed by the user's hand and recognizes an instruction associated with an object displayed in a touched position. Examples of the instruction include an instruction for causing the object displayed in the touched position to enter a selected state and an instruction for executing a command associated with the object. Furthermore, the recognition unit 106 may recognize a gesture operation without touching in accordance with a shape or a movement of the user's hand.

A region specifying unit 107 detects an isolation region among movement regions extracted by the movement region extraction unit 102. In this embodiment, an isolated movement region means that the movement region is not in contact with a contour of the operation surface in the input image. Here, the operation surface is a target of a touch operation, and is a table top surface in a case of a tabletop interface, for example. When an angle of view of the range image sensor 116 is smaller than the table top surface, a range within the angle of view is used as an operation surface. Hereinafter, a space existing over the operation surface is referred to as an "operation area". In this embodiment, an instruction object, such as a user's hand, strides a contour of the operation surface since the user performs an operation by inserting the hand from an outside of the operation area. Specifically, the movement region corresponding to the instruction object is in contact with the contour of the operation surface in the image. On the other hand, it may be determined that the isolated region which is not in contact with the contour of the operation surface is not an instruction object.

A change determination unit 108 determines whether the isolation region detected by the region specifying unit 107 has been changed. An updating unit 109 updates information on the operation surface using three-dimensional positional information in the isolation region detected by the region specifying unit 107. In this embodiment, information on a height of the isolation region is synthesized with information on a height of the operation surface so that a touch on the solid object is detected when the solid object is mounted on the operation surface which is in an initial state.

These functional units are realized when a CPU (Central Processing Unit) 111 develops a program stored in a ROM (Read Only Memory) 112 in a RAM (Random Access Memory) 113 and executes processes in accordance with flowcharts described below. When the functional units are configured as hardware as alternatives of the software processes using the CPU 111 described above, calculation units and circuits corresponding to the processes of the functional units described herein are configured.

Figure 1B:
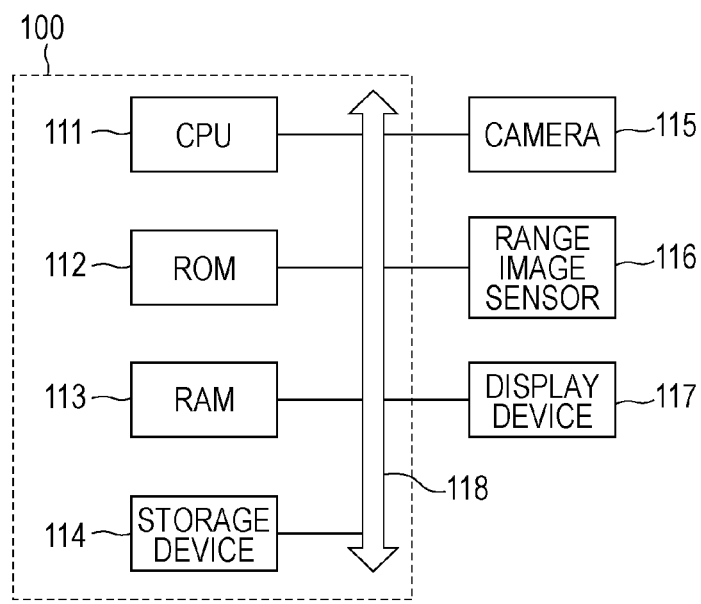

FIG. 1B is a diagram illustrating a hardware configuration of a tabletop interface including the image processing apparatus 100 according to this embodiment. The CPU 111 performs calculations and logical determinations for various processes by executing a control program of the image processing apparatus 100 so as to control components connected to a system bus 118. The ROM 112 is a program memory which stores a program including various processing procedures described below for control performed by the CPU 111. The RAM 113 is used as a work area of the CPU 111, a save area for data at a time of an error process, and a region for loading the control program. A storage device 114 is a hard disk or a connected external storage device which stores data and programs according to this embodiment, and stores various data to be used by the image processing apparatus 100.

A camera 115 is a visible light camera which obtains a visible light image. The range image sensor 116 captures a range image in which information on distances to pixels included in the angle of field is reflected. The range information may be obtained by measuring a reflection time of light, such as infrared light, obtained after the light is projected, by measuring a distance using a shape of irradiated pattern light, by a stereo camera, or the like. In this embodiment, an infrared pattern projection method which is less affected by ambient light and display of a table surface is employed. Furthermore, the range image sensor 116 may function as the camera 115. A display device 117 is a display, a projector, or the like to display images of UIs, information, and the like. In this embodiment, a liquid crystal projector is used as the display device 117.

Note that, in this embodiment, the camera 115, the range image sensor 116, and the display device 117 are external devices connected to the image processing apparatus 100 through respective input/output interfaces and constitute an information processing system with the image processing apparatus 100. However, these devices may be integrally disposed in the image processing apparatus 100.

Figure 2A:
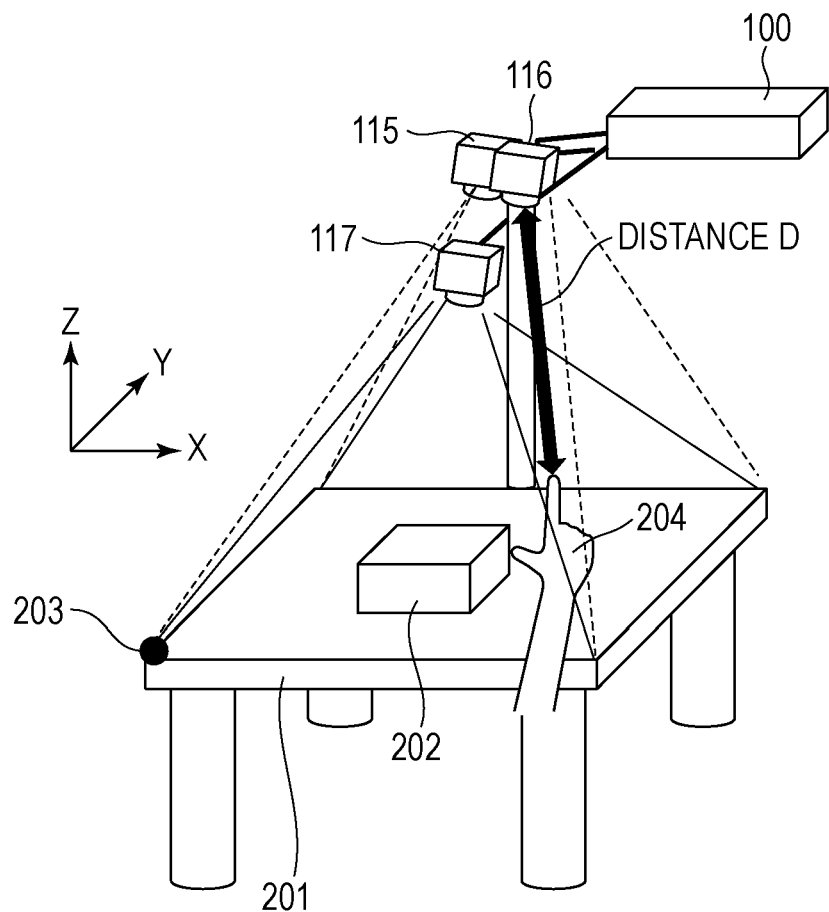
FIGS. 2A and 2B are diagrams illustrating appearance of a tabletop interface including the image processing apparatus according to the first embodiment disposed thereon and defined positional information.

FIG. 2A is a diagram illustrating appearance of a tabletop interface including the image processing apparatus 100 according to the first embodiment disposed thereon and definition of positional information. A flat plate 201 is a table portion of the tabletop interface, and the user may perform a touch operation by touching the flat plate 201. In this embodiment, an upper surface of the flat plate 201 is an operation surface in an initial state. In the tabletop interface system of this embodiment, when a solid object 202 is mounted on the flat plate 201, the solid object 202 is synthesized as a portion of the operation surface, and a touch operation performed on the solid object 202 may be accepted. The range image sensor 116 obtains a range image having pixel values in which distances from the range image sensor 116 to a surface of an object in a space over the flat plate 201 are reflected by capturing an image of the space and inputs the range image to the image processing apparatus 100. When a gesture operation or the like is to be recognized by tracing a user's hand in a system of an input image as illustrated in FIG. 2A, a method for detecting a skin color portion corresponding to the hand in a visible light image captured by the camera 115 may be employed. However, in this embodiment, a color of the user's hand on the flat plate 201 is changed in the visible light image since the image is projected by the liquid crystal projector, and therefore, the skin color portion of the user's hand may not be reliably detected by the skin color detection. Accordingly, in this embodiment, the user's hand is detected in accordance with a distance from the range image sensor 116 to the flat plate 201 obtained by the range image sensor 116 which obtains range information by a reflection pattern (or a reflection time) of infrared light so that influence of projection light by the projector is reduced.

The display device 117 is a liquid crystal projector which projects a display image including various information, such as a UI component to be subjected to a touch operation, on the flat plate 201. The visible light camera 115 captures a visible light image by viewing a range including the flat plate 201. The image processing apparatus 100 functions as a document camera by obtaining an image of a predetermined object (a document, such as a paper medium or a book, or a solid object) included in the image captured by the camera 115 as a read image. In this embodiment, the user performs an operation of a touch, a space gesture, or the like on an image projected on the operation surface by the display device 117. However, instead of the display device 117, the flat plate 201 may serve as a liquid crystal display device capable of performing display and output as a display.

In this embodiment, positional information is obtained while X, Y, and Z axes in a three-dimensional space on the operation surface illustrated in FIG. 2A are defined. Here, a point 203 is set as an origin, a two-dimensional surface which is parallel to a table top surface is defined as xy plane, and a direction orthogonal to the table top surface and extending upward corresponds to a positive direction of the z axis, for example. Since the z axis direction corresponds to a height direction in a world coordinate system in this embodiment, information on a three-dimensional position (three-dimensional shape) of the operation surface may be referred to as information on a height or height information where appropriate. A user's hand 204 is an example of an instruction object used to perform a touch operation or a gesture operation by the user.

Figure 2B:
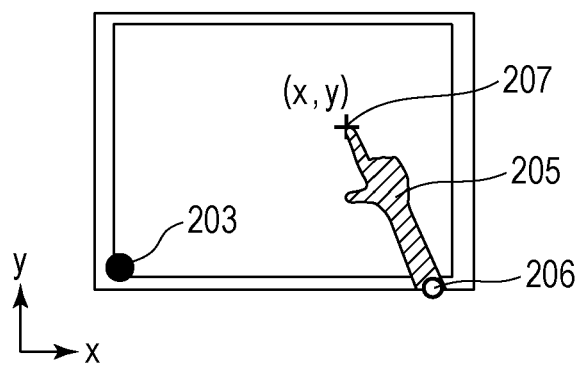

FIG. 2B is a diagram illustrating a range image input to the image processing apparatus 100. A region 205 represents a movement region corresponds to the user's hand 204, and an intrusion position 206 corresponds to a position where the region 205 intersects with one of four sides of an image (an end portion of the angle of view). In the system of this embodiment, a face or a body of the user is not directly included in the range image, and therefore, the position where the movement region intersects with one of the four sides of the image is detected as the intrusion position serving as information on a position of the user. Thereafter, in this embodiment, a point included in the region 205 which is farthest from the intrusion position 206 is determined as an operation position 207 corresponding to a fingertip of the user. A method for determining the operation position 207 is not limited to this, and five fingers of the hand may be detected and one of tips of the five fingers may be determined as an operation position, or a center of gravity of a palm of the hand may be determined as an operation position, for example. In a case of the system of this embodiment, a distance D from the range image sensor 116 to the fingertip of the user illustrated in FIG. 2A is reflected on a value of a pixel corresponding to the operation position 207 in the range image illustrated in FIG. 2B. Therefore, in this embodiment, a three-dimensional position is obtained by a transformation matrix for transformation into a three-dimensional coordinate (X, Y, Z) using an operation position (x, y) in the range image and a pixel value representing the distance D. This transformation matrix is obtained by calibration in advance when the range image sensor 116 is fixed. By this transformation, the image processing apparatus 100 obtains a hand region including the image of the user's hand 204 and a three-dimensional position of the operation position 207 corresponding to the fingertip and detects an operation, such as an operation of touching the operation surface by the fingertip.

Note that, in this embodiment, as the positional relationship between the display device 117 and the flat plate 201, the display device 117 and the flat plate 201 are fixed such that the center of the flat plate 201 and the center of a display screen projected by the display device 117 coincide with each other and image projection may be performed on a range of 90% or more of the upper surface of the flat plate 201. Note that a housing of the display device 117 may not be disposed over the flat plate 201 as long as projection on the flat plate 201 is available. Similarly, a housing of the range image sensor 116 may not be disposed over the flat plate 201 as long as range information in height direction (a z axis direction) may be obtained.

In this embodiment, a touch operation on an object may be accepted by mounting the object on an upper surface of the flat plate 201 serving as the operation surface in the initial state. In this case, a height threshold value for determining whether a user's finger or the like is in contact with the operation surface may be the same as that employed in a case where contact to the operation surface in the initial state is detected when the mounted object has a small thickness, such as a sheet. However, in a case where a mounted object has a large thickness, such as a case of the solid object 202, a definition of the operation surface (a height definition) is required to be updated.

Figure 3:
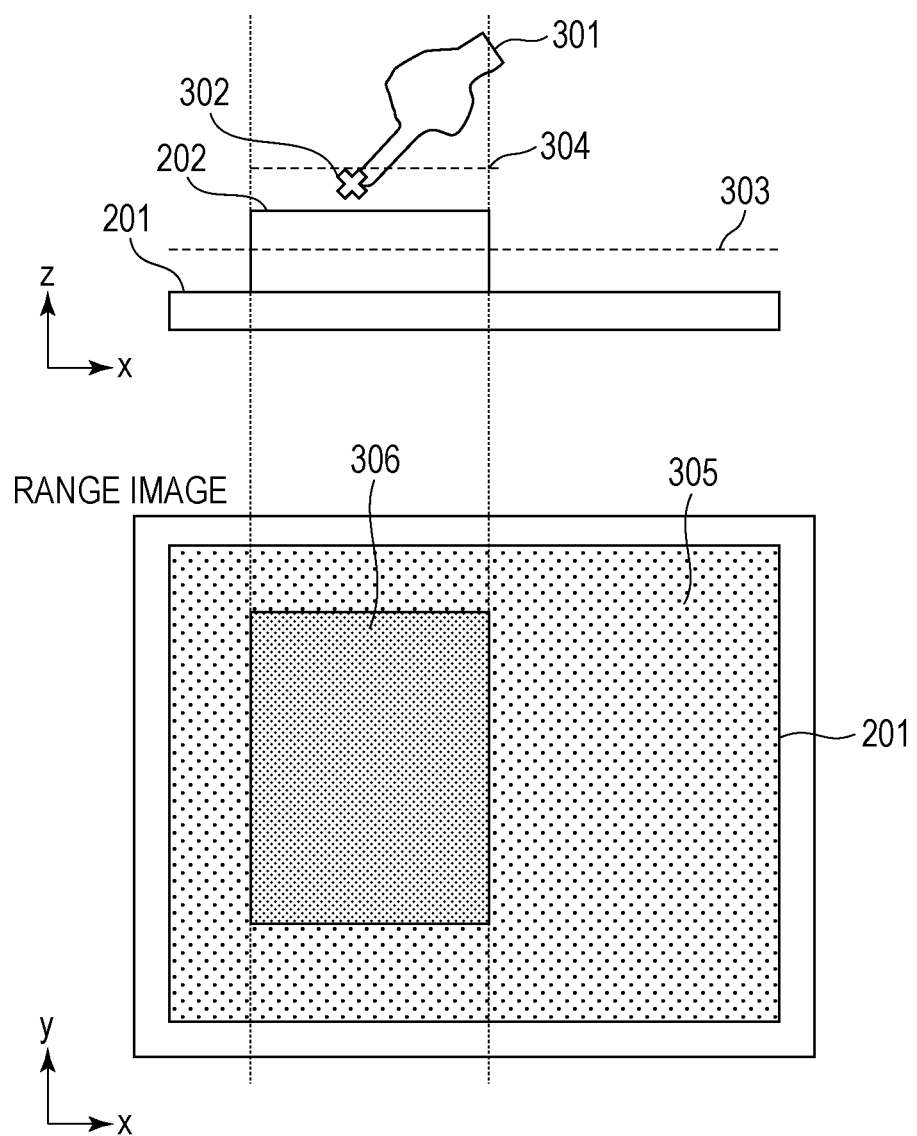
FIG. 3 is a diagram illustrating a state of a solid object disposed on an operation surface and a user's hand.

FIG. 3 is a diagram illustrating a state of a solid object mounted on the operation surface and the user's hand. In FIG. 3, a sectional view which is in parallel to a zx plane in a portion in the vicinity of the flat plate 201 and a range image (corresponding to an xy plane) obtained by capturing a state in which the solid object 202 is mounted on the flat plate 201 by the range image sensor 116 are associated with each other in the vertical direction while x axes extend in the same direction. In this embodiment, a definition of a three-dimensional shape (a definition of a height) of the operation surface serving as a target of a touch operation is updated since the solid object 202 is mounted on the flat plate 201. In this embodiment, an adjacency state between a fingertip portion of a user's hand 301 and the operation surface is detected based on a distance, and when a distance between the fingertip portion and the operation surface is smaller than a predetermined distance threshold value, it is recognized that the operation surface is touched by a touch operation. Specifically, first, the image processing apparatus 100 detects a position of a fingertip of the user's hand 301 as an operation position 302. When a height (a z coordinate) of the operation position 302 obtained from an input image is smaller than a height threshold value 303 of the operation surface in the initial state, it is recognized that the user's hand 301 has touched the flat plate 201. However, when the solid object 202 is mounted, the height of the operation surface is increased by a height of the solid object 202 in a portion corresponding to the solid object 202, and therefore, a height threshold value 304 based on a height of a surface of the solid object 202 is set so that a touch on the solid object 202 is recognized.

The range image in a lower portion in FIG. 3 represents that as color density is increased (as concentration of points is high), a distance to the range image sensor 116 is small, that is, a height is large (a z coordinate is large). Hereinafter, the same is true when the range image is illustrated in drawings. When the solid object 202 is mounted, a touch is detected in a region 305 which does not include the solid object 202 on the flat plate 201 by threshold-based processing using the height threshold value 303 and a touch is detected in a region 306 which includes the solid object 202 by threshold-based processing using the height threshold value 304. Note that a process of determining a solid object mounted on an operation surface as a portion of a background is effective when an instruction object, such as a user's hand, is extracted from a range image while the instruction object is distinguished from the background even in a system in which a touch on a solid object is not recognized.

Figure 4:
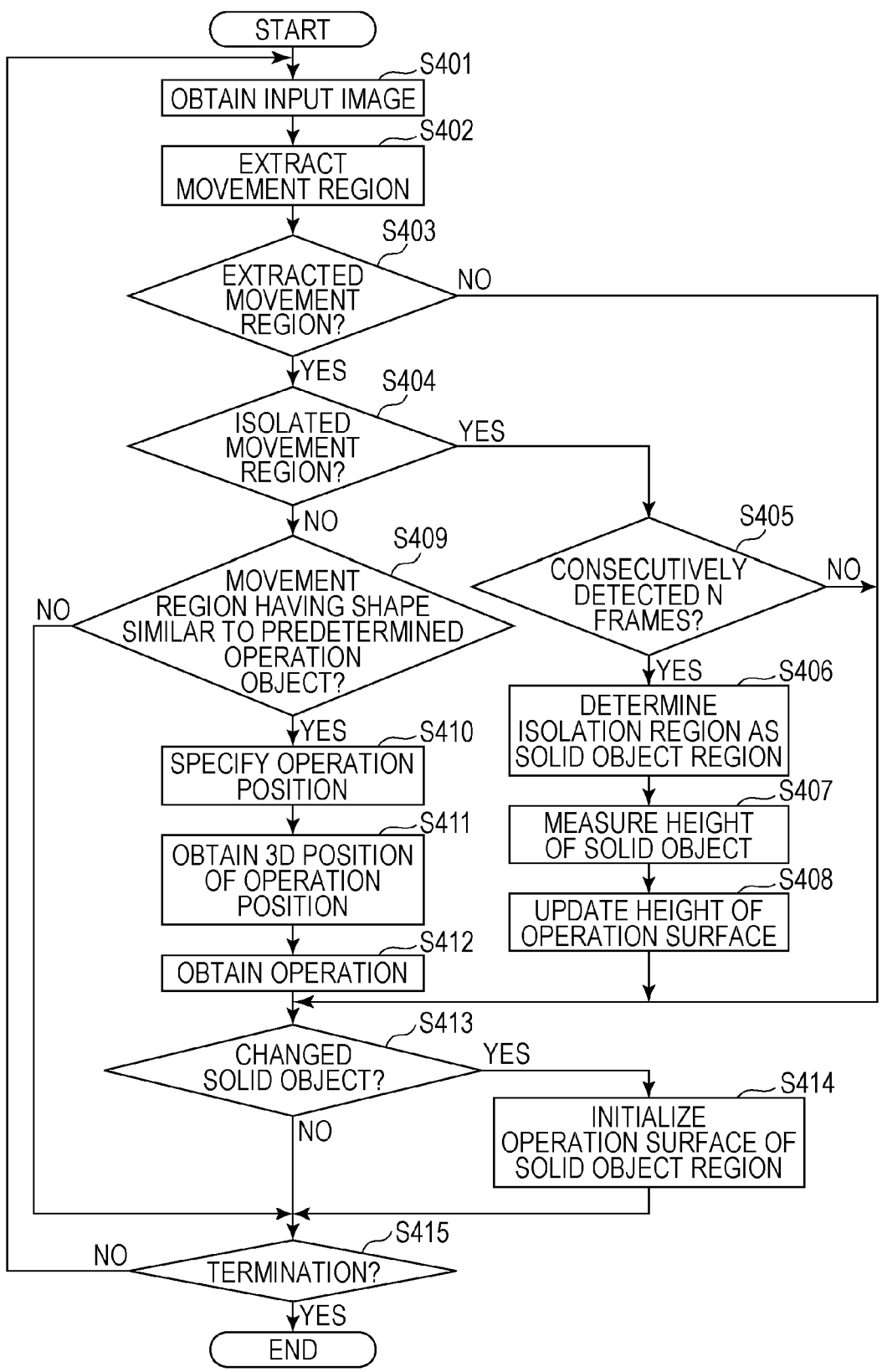
FIG. 4 is a flowchart illustrating a process of obtaining information on a height of the operation surface executed by the image processing apparatus according to the first embodiment.

FIG. 4 is a flowchart illustrating a process of obtaining information on a height of the operation surface executed by the image processing apparatus 100 according to this embodiment. In this embodiment, the CPU 111 starts a process of the flowchart of FIG. 4 when the range image sensor 116 supplies an input signal of a range image for one frame to the image processing apparatus 100. It is assumed that the range image sensor 116 of this embodiment repeatedly captures a range image in a predetermined cycle, and the process of the flowchart of FIG. 4 is repeatedly executed every time a range image for one frame is input. Note that a frame rate is appropriately set in accordance with processing capability of the system.

In step S401, the image obtaining unit 101 obtains a range image captured by the range image sensor 116 as an input image. In step S402, the movement region extraction unit 102 extracts a movement region included in the input image. In this embodiment, the movement region is detected by a background subtraction.

Figure 5A:
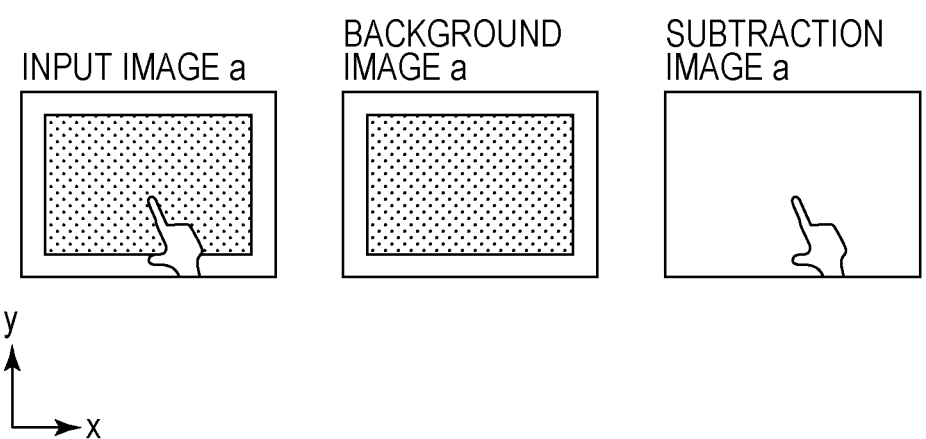
FIGS. 5A and 5B are diagrams illustrating images used in a process of extracting a movement region by a background subtraction method.
Figure 5B:
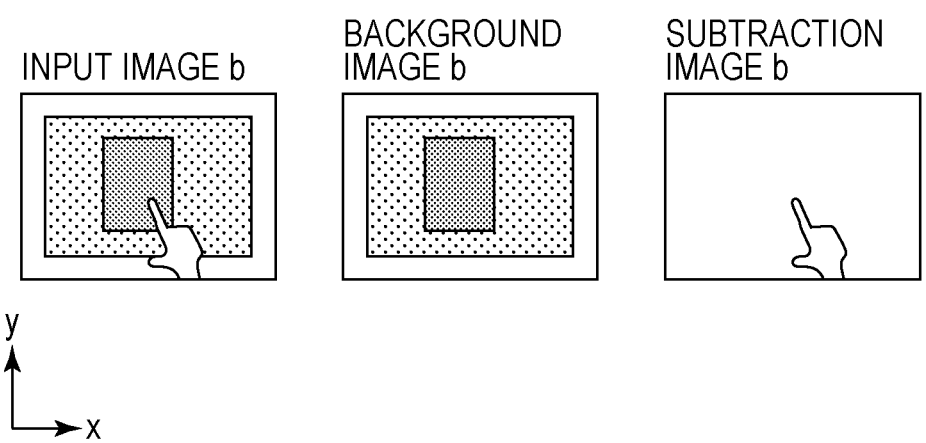

A process of extracting a movement region by a background subtraction method will be briefly described with reference to FIGS. 5A and 5B. In FIGS. 5A and 5B, a range image to be subjected to the process of extracting a movement region by the background subtraction method is illustrated. Left portions in FIGS. 5A and 5B represent input images, center portions represent background images, and right portions represent subtraction images between the input images and the background images. The background images are range images obtained by capturing the operation surface, and information on the height of the operation surface is reflected on the range images. The images in FIG. 5A are captured in an initial state, and a background image a corresponds to a range image obtained by capturing the flat plate 201. The images in FIG. 5B represent a state in which the solid object 202 is mounted on the flat plate 201, and a background image b is obtained by synthesizing a height of the solid object 202 with the background image a in the initial state. Note that the background image a in the initial state is obtained and stored as calibration when the range image sensor 116 is fixed or immediately after the image processing apparatus 100 is activated.

In the background subtraction method, a region including an image of an object included in a foreground portion relative to a background is extracted by subtracting a background image from an input image. In the case of the system illustrated in FIG. 2, a region including an image of an object positioned in a space over the operation surface is an extraction target. In a case of the state illustrated in FIG. 5A, the movement region extraction unit 102 obtains a subtraction image a by subtracting the background image a from the input image a. The subtraction image a is obtained by extracting a portion corresponding to a user's hand on the operation surface from the input image a. A region extracted as the subtraction image is referred to as a "movement region" since image information on a movable object in a foreground is extracted using information on a still background. The object included in the region to be extracted as the movement region may be or may not be actually moved. In this embodiment, when the solid object 202 is mounted, the background image is updated in a process described hereinafter. In a state of FIG. 5B obtained after the background image is updated, the movement region extraction unit 102 obtains a subtraction image b by subtracting the background image b from an input image b, that is, the movement region extraction unit 102 extracts a movement region. By updating the background image, even when a solid object is included in a background, only a user's hand may be extracted as a movement region. In step S402, the movement region extraction unit 102 stores information on the extracted movement region in the RAM 113.

Subsequently, in step S403, the movement region extraction unit 102 determines whether one or more movement regions have been extracted in accordance with the information stored in the RAM 113. When it is determined that one or more movement regions have been extracted (Yes in step S403), the process proceeds to step S404. When it is determined that one or more movement regions have not been extracted (No in step S403), the process proceeds to step S413.

Figure 6A:
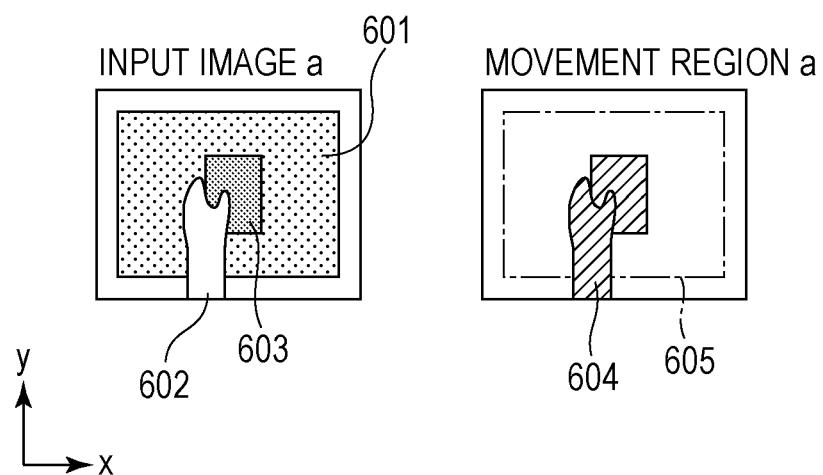
FIGS. 6A and 6B are diagrams illustrating an image process of detecting an isolation region according to the first embodiment.

In step S404, the region specifying unit 107 detects an isolation region by determining whether each of the extracted one or more movement regions is isolated in the operation area. Here, an image process of detecting an isolation region will be described in detail with reference to FIGS. 6A and 6B. FIG. 6A is a diagram illustrating a stage in which the user holds a solid object 603 by a hand 602, inserts the solid object 603 in an operation area, and places the solid object 603 on a flat plate 601. A left portion of FIG. 6A represents an input image in this stage and a right portion of FIG. 6A represents a contour of an extracted movement region 604. A dashed line 605 represents an isolation determination boundary corresponding to a contour of the operation surface. Although the dashed line 605 corresponds to an edge of the operation surface in this embodiment, a region in the dashed line 605 may have such a size relationship with the operation surface that the dashed line 605 includes the operation surface. A boundary line used as the isolation determination boundary forms a predetermined closed region included in the input image, and four sides of the input image or a predetermined boundary line defined inside the operation surface may be used as a boundary for determining an isolation region, for example. Note that a boundary of a sufficiently large size is set so that a general solid object to be operated is not in contact with the boundary when the user places the solid object on the flat plate 601.

Figure 6B:
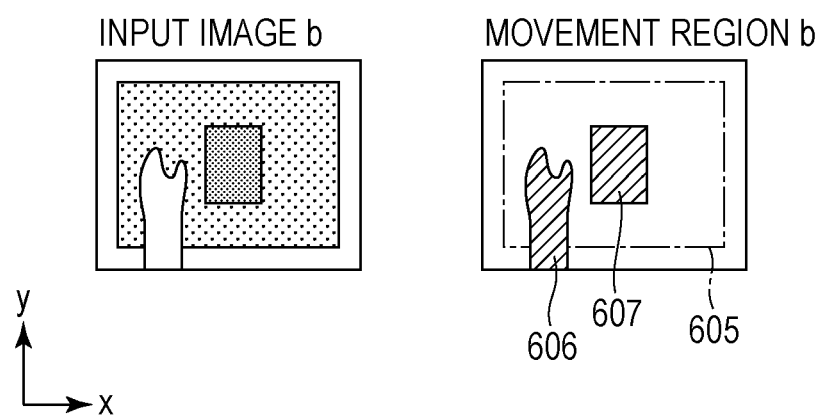

The region specifying unit 107 detects an isolation region among the detected movement regions by determining whether each of the movement regions is in contact with the isolation determination boundary 605. For example, in a case of FIG. 6A, the movement region 604 is in contact with the isolation determination boundary 605, and therefore, the movement region 604 is not detected as an isolation region. On the other hand, FIG. 6B is a diagram illustrating a stage in which the user releases the hand 602 from the solid object 603 after performing an operation of placing the solid object 603 on the flat plate 601. A left portion of FIG. 6B represents an input image in this stage and a right portion of FIG. 6B represents contours of the extracted movement regions 606 and 607. In a case of FIG. 6B, the movement regions 606 and 607 are extracted, and the movement region 607 is not in contact with the isolation determination boundary 605. Therefore, the region specifying unit 107 detects the movement region 607 as an isolation region and stores information on the movement region 607 in the RAM 113. Note that, when a plurality of movement regions are extracted in step S402, the process is repeatedly performed while ID numbers assigned to the movement regions are incremented one by one so that it is determined whether each of the movement regions is isolated. Note that, in FIG. 4, the repetitive process is omitted, and the process is performed on only one movement region.

When it is determined that the movement region is isolated (Yes in step S404), the process proceeds to step S405. On the other hand, when it is determined that the movement region is not isolated (No in step S404), the process proceeds to step S409.

In step S405, the region specifying unit 107 determines whether the same isolation region has been consecutively detected in input images for predetermined past N frames. Specifically, in step S405, it is determined whether the same isolation region has been detected for a predetermined period of time corresponding to consecutive N frames. Information for the past N frames is detected with reference to information stored in the RAM 113. When it is determined that the same isolation region has been consecutively detected in input images for N frames (Yes in step S405), the process proceeds to step S406. When it is determined that the same isolation region has not been consecutively detected in N frames (No in step S405), the process proceeds to step S413.

In step S406, the region specifying unit 107 determines that the detected isolation region corresponds to a solid object. Hereinafter, the isolation region specified as a solid object is referred to as a "solid object region". The determination process in step S405 and step S406 is performed to omit a process of updating the height information of the operation surface when a height is temporarily increased when a flat object, such as a sheet, floats in the operation area. In step S407, the position obtaining unit 105 obtains positional information in the height direction from pixel values of the solid object region. In step S408, the updating unit 109 synthesizes information on a three-dimensional shape of the solid object with information on a three-dimensional shape of the operation surface in accordance with the positional information in the height direction of the solid object region. Specifically, a synthesized range image of the operation surface is used as a background image in a process of detecting a movement region to be executed later.

Figure 7A:
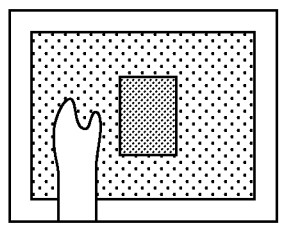
FIGS. 7A to 7E are diagrams illustrating an image process of synthesizing a solid object as a portion of the operation surface according to the first embodiment in detail.
Figure 7B:
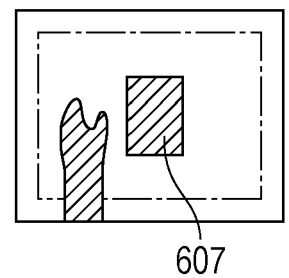
Figure 7C:
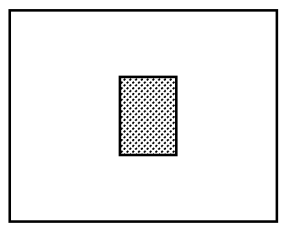
Figure 7D:
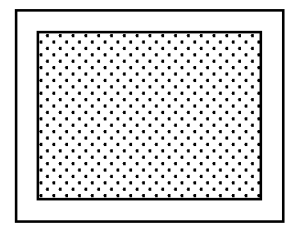
Figure 7E:
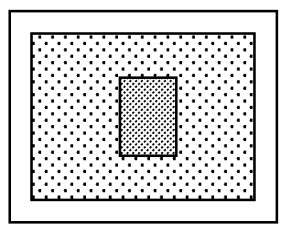

Here, FIGS. 7A to 7E are diagrams illustrating an image process of synthesizing a solid object as a portion of the operation surface. The synthesis process executed in step S408 will be described in detail with reference to FIGS. 7A to 7E. FIG. 7A is a diagram illustrating an input image in a state the same as that of FIG. 6B. FIG. 7B is a diagram illustrating a movement region extracted from the input image of the FIG. 7A, and the region 607 is detected as an isolation region. In this embodiment, the region 607 is specified as a solid object region since the region 607 is detected for a predetermined period of time, and therefore, the position obtaining unit 105 obtains three-dimensional position information of the region 607. FIG. 7C is a diagram illustrating a range image representing the obtained three-dimensional positional information (range information in the height direction). Since the input image is a range image obtained by the range image sensor 116 in this embodiment, the range image in FIG. 7C corresponds to pixel values of the isolation region of the input image in FIG. 7A. Note that, in this embodiment, the three-dimensional positional information of the isolation region 607 is obtained from the latest frame in the N frames consecutively detected in step S405. Note that the frame from which the three-dimensional positional information is obtained is not limited to the latest frame in the N frames and the three-dimensional positional information may be obtained from a logical sum of isolation regions of the N frames, for example. FIG. 7D is a diagram illustrating an image (background image) representing the three-dimensional positional information of the operation surface in the initial state which is stored in advance in the recognition unit 106, and corresponds to an input image obtained when a movement image does not exist. FIG. 7E is a diagram illustrating the three-dimensional positional information of the operation surface obtained when the updating unit 109 synthesizes the images in FIGS. 7C and 7D with each other in step S408. Height information in a certain range of FIG. 7D is replaced by the positional information in the height direction of the region of the solid object which is detected by the region specifying unit 107 in the range image of FIG. 7C and which corresponds to the certain range. In a stage of the process in step S408, it is ensured that the solid object is isolated in the operation area. Specifically, in the image, the solid object is separated from the hand and the possibility that the solid object is hidden by the hand is not required to be taken into consideration. Therefore, in step S408, the three-dimensional positional information of the operation surface may be updated without interference by the hand.

On the other hand, when the movement region is not isolated in step S404, the object identification unit 103 determines whether the detected movement region has a shape similar to a predetermined instruction object in step S409. The determination as to whether the movement region has a shape similar to an operation object is made in accordance with a size of the movement region, a shape including an aspect ratio, or model matching. In a case where the predetermined instruction object is a user's hand, a determination condition may be set such that any shape similar to a human hand is detected as an instruction object, or a condition may be set such that only a hand which makes a predetermined posture may be detected as an instruction object. In this embodiment, a condition is set such that it is determined that the movement region has a shape similar to an instruction object in a case where the user's hand makes such a posture that only a pointer finger is stretched, that is, a pointing posture. When the object identification unit 103 determines that the movement region has a shape similar to a predetermined instruction object (Yes in step S409), the process proceeds to step S410. When the object identification unit 103 determines that the movement region does not have a shape similar to a predetermined instruction object (No in step S409), the process proceeds to step S415.

In step S410, the operation position specifying unit 104 detects an operation position of the instruction object. In this embodiment, as illustrated in FIGS. 2A and 2B, a position of the fingertip of the user's hand is specified as positional information represented by an xy coordinate in accordance with a coordinate axis defined in the flat plate. In step S411, the position obtaining unit 105 obtains a three-dimensional position of the operation position. In this embodiment, information included in the range image is converted in accordance with the definition of the coordinate illustrated in FIGS. 2A and 2B so that a three-dimensional coordinate (X, Y, Z) of the position of the fingertip of the user is obtained. In step S412, the recognition unit 106 detects an operation of the operation object in accordance with the obtained three-dimensional position. As an example, as illustrated in FIG. 3, a touch on the operation surface is detected in accordance with a determination as to whether a height of the operation position 302 is smaller than the height threshold value 303 of the operation surface in the initial state or the height of the threshold value 304 which is set after the operation surface is updated in accordance with the solid object 202. Furthermore, dragging for moving an operation position during touching, zooming performed using two operation positions, rotating, and the like may be detected. In step S413, the change determination unit 108 determines whether the solid object region is changed. The change of the solid object region means change of range information in the solid object region caused when the detected solid object is removed, moved, or deformed.

Here, the process of determining whether a solid object region is changed which is executed in step S413 will be described in detail with reference to a flowchart of FIG. 8. First, in step S801, the change determination unit 108 determines whether a solid object was detected in the input image within a predetermined past period of time. When it is determined that a solid object was detected (Yes in step S801), the process proceeds to step S802. When it is determined that a solid object was not detected (No in step S801), change is not detected and the process proceeds to step S805 where it is determined that the solid object region has not changed, and thereafter, the process returns to the main flow.

In step S802, the change determination unit 108 determines whether a height of a portion of the solid object region has been changed. This process is performed to determine whether the solid object has been shifted in the xy plane. Specifically, positional information in the height direction of the solid object portion extracted from the input image of a preceding frame is compared with positional information in the height direction of the solid object portion extracted from the input image of the latest frame (at a current time point) so that a changing rate of a portion changed in height is determined.

Figure 9:
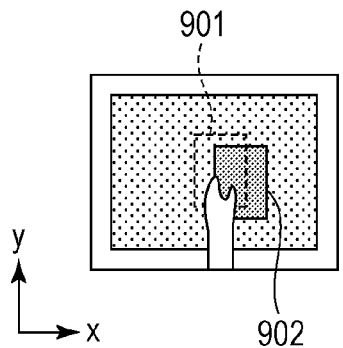
FIG. 9 is a diagram illustrating a range image obtained when the isolation region is changed according to the first embodiment.

FIG. 9 is a diagram illustrating the change of the solid object region detected in step S802. In FIG. 9, a region 901 defined by a dotted line represents a preceding region in which the solid object existed and represents an isolation region detected by the region specifying unit 107 in the input image of the preceding frame. Since the user moves the solid object by the current time point, the solid object region is moved to a region 902 in the latest frame. When the input images are compared with each other, it is detected as if a height of a portion of the region 901 is reduced from a height of the solid object to a height of the flat plate 201. The change determination unit 108 obtains a rate of an area of the portion in which a height is reduced or increased (a portion obtained by subtracting an overlapping portion between the region 901 and the region 902 from the region 901) to an area of the region 901 in the xy plane detected by the region specifying unit 107 in the preceding frame. Thereafter, the change determination unit 108 determines whether the obtained rate is larger than a predetermined rate P %. Note that, when a height of a portion of the detected solid object region is increased, it is possible that another movement region is overlapped, and therefore, it is not necessarily the case that the change is caused by a single object. However, the change is detected by a process the same as that performed when a single object is moved in this embodiment. When it is determined that a height of a portion of the solid object region has been changed (Yes in step S802), the process proceeds to step S804. When it is determined that a height of a portion of the solid object region has not been changed (No in step S802), the process proceeds to step S803.

In step S803, the change determination unit 108 determines whether an isolation region which is at least partially in contact with the latest solid object region detected by the preceding frame is included in the solid object region in accordance with the input image in the latest frame. Note that the meaning of the expression "in contact with" includes a case of the inclusion relationship. When it is determined that the solid object region of the latest frame is at least partially in contact with the latest solid object region detected by the preceding frame (Yes in step S803), the process proceeds to step S804. When it is determined that the solid object region of the latest frame is not in contact with the latest solid object region detected by the preceding frame (No in step S803), the process proceeds to step S805 where it is determined that the solid object has not been changed and the process returns to the main flow.

In step S804, the change determination unit 108 determines that the solid object region has been changed. The determination as to whether the solid object region detected in the predetermined past period of time is in contact with the latest solid object region is made in step S803 since, when the same solid object is moved or deformed, solid objects consecutively detected appear in a state in which the solid objects are in contact with each other.

In step S413, when it is determined that the solid object region has been changed in accordance with the determination criterion described above (Yes in step S413), the process proceeds to step S414. In step S414, the updating unit 109 resets the three-dimensional position (information defining a height) of the operation surface corresponding to the portion of the solid object to an initial state, and thereafter, the process proceeds to step S415. In the example of FIGS. 7A to 7E, operation surface information of FIG. 7E updated in step S408 is reset to a state of FIG. 7D. On the other hand, when it is determined that the solid object region has not been changed in step S413 (No in step S413), the process in step S414 is omitted and the process proceeds to step S415. In step S415, it is determined whether termination of the process of the image processing apparatus 100 has been instructed, and when the instruction has not been issued, the process returns to step S401.

Figure 10A:
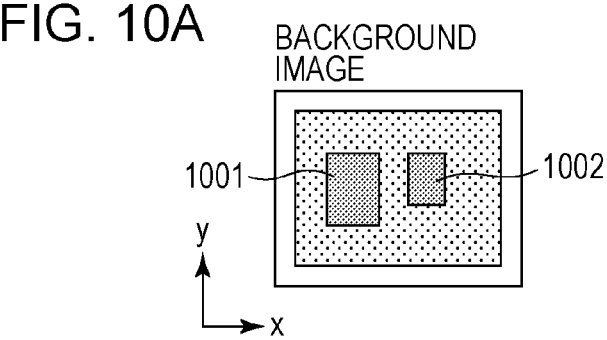
FIGS. 10A to 10O are diagrams illustrating an image process performed when one of a plurality of mounted solid objects is removed according to the first embodiment.
Figure 10B:
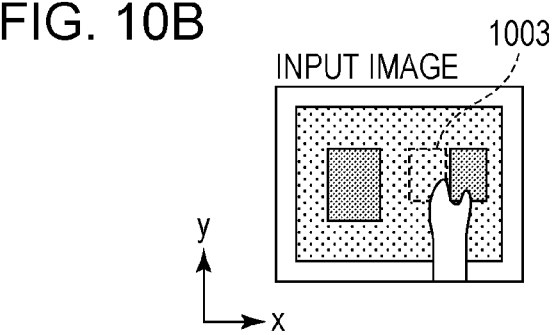
Figure 10C:
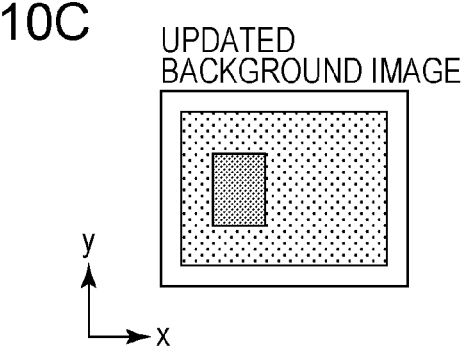

Note that, in step S414 of this embodiment, the updating unit 109 at least initializes information on the height of the operation surface corresponding to the portion in which the solid object region is changed in the solid object region. Here, the process in step S413 and step S414 will be described in detail with reference to FIGS. 10A to 10O. FIGS. 10A to 10O are diagrams illustrating an image process performed when one of a plurality of mounted solid objects is removed. FIG. 10A is a diagram illustrating a range image (a background image) representing the operation surface updated by the updating unit 109 in step S408 when a plurality of solid objects are mounted. Regions 1001 and 1002 are obtained by individually synthesizing two isolation regions detected in the input image by the region specifying unit 107. FIG. 10B is a diagram illustrating an input image when the user moved a right object. Since a height of an isolation region denoted by a dotted line 1003 is reduced, the change determination unit 108 detects a change in the region 1003 in step S802. FIG. 10O is a diagram illustrating a range image representing the operation surface reset by the updating unit 109 in accordance with the change of the isolation region. The updating unit 109 resets only the three-dimensional positional information of the operation surface corresponding to the isolation region 1002 in which the change is detected and three-dimensional positional information of the operation surface corresponding to the isolation region 1001 is maintained.

As described above, according to this embodiment, when a solid object is inserted into an operation area and mounted on the operation area, information on a height of an operation surface is updated to information on a height of the solid object in accordance with measurement of a three-dimensional position. By this, the user may detect an operation of touching the solid object.

However, in the example described above, it is determined that a solid object having a certain height (a solid object which requires change of a height threshold value) is mounted when it is determined that an isolation region is consecutively detected in N frames. However, the process in step S405 may be omitted depending on a frame rate for obtaining an input image. Alternatively, in step S405, it may be determined whether an isolation region is moved in a period of time corresponding to the N frames in accordance with a position coordinate of a center of gravity, and only a solid object which is not moved may be detected. Furthermore, in this embodiment, when it is determined that the solid object region has been changed in step S413 for the information on the operation surface updated once in step S408, the process of initializing at least a portion of the operation surface is performed. However, a determination as to whether the solid object region has been changed may be made when the solid object region is specified in step S406, and thereafter, the updating process may be performed in accordance with a result of the determination.

An effect of the initialization of the operation surface information in the solid object region after removal of the solid object is detected by a detection of the solid object region which is in contact with a detected solid object region in step S803 will be described further in detail with reference to FIGS. 11A to 11D, FIGS. 12A to 12D, FIGS. 13A to 13D, FIGS. 14A to 14D, and FIGS. 15A to 15D.

FIGS. 11A to 11D are diagrams illustrating an image process performed when a mounted solid object is moved slowly. Note that, in FIGS. 11A to 11D, FIGS. 12A to 12D, FIGS. 13A to 13D, FIGS. 14A to 14D, and FIGS. 15A to 15D, input images are illustrated in left portions, background images are illustrated in center portions, and subtraction images between the input images and the background images are illustrated in right portions.

Figure 11A:
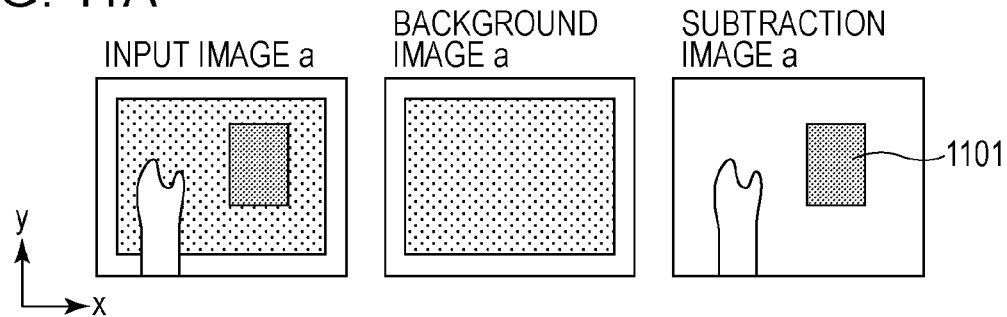
FIGS. 11A to 11D are diagrams illustrating an image process performed when a mounted solid object is moved slowly according to the first embodiment.
Figure 11B:
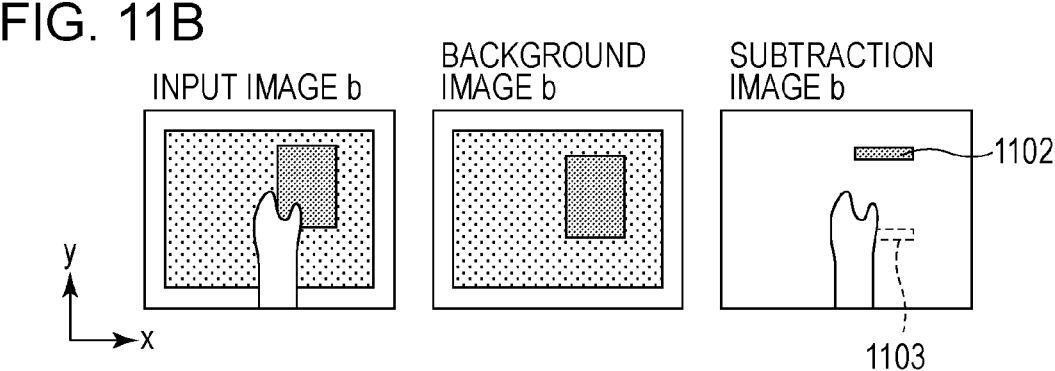
Figure 11C:
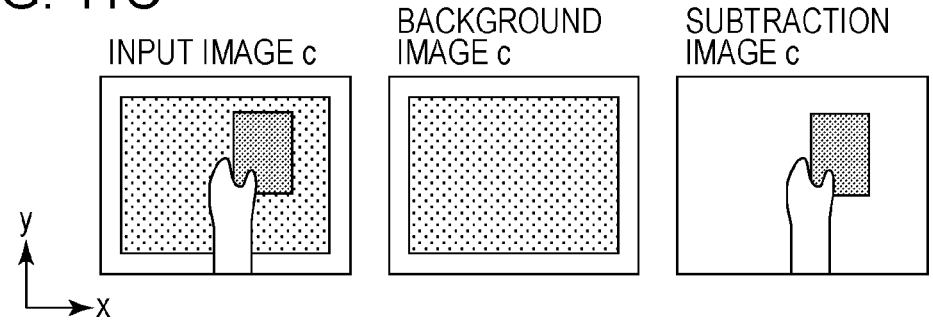
Figure 11D:
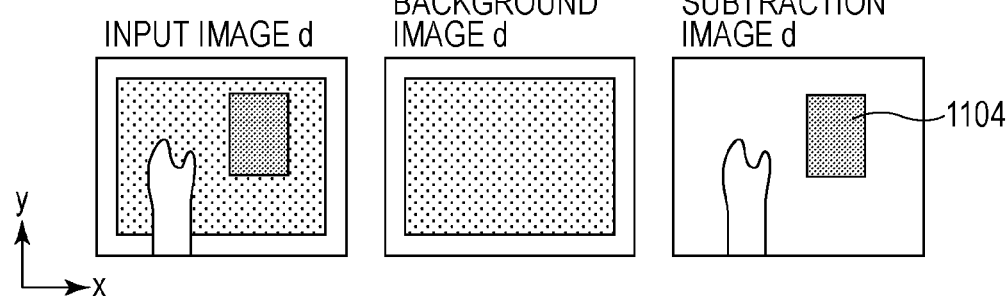

A status change will be described as below. The user inserts and places a solid object in an operation area and temporarily releases the hand as illustrated in FIG. 11A, the user touches the solid object again and moves the solid object a little as illustrated in FIG. 11B, the background image is updated as illustrated in FIG. 11C, and the user releases the hand from the solid object again as illustrated in FIG. 11D. In FIG. 11A, an isolation region 1101 which is not in contact with an isolation determination boundary in a subtraction image a is specified as a solid object in step S406 in accordance with a subtraction of a background image a in an initial state from an input image a. By this, in step S408, the isolation region 1101 is synthesized with the background image a, and the background image a serving as information on a height of the operation surface is updated to a background image b illustrated in FIG. 11B. In FIG. 11B, an isolation region 1102 is detected from a subtraction image b in step S406 in accordance with a subtraction of the synthesized background image b from an input image b. Furthermore, a region 1103 represents a region having a height reduced to the operation surface in the region 1101 including the solid object in a preceding stage illustrated in FIG. 11A.

Here, when a size of the region 1103 is larger than a threshold value P % (a rate of a size of the region 1103 to the region 1101), it is determined that a height of the isolation region has been changed in step S802. However, when the solid object is moved slowly such that a change of the size of the isolation region in consecutive frames does not exceed a threshold value, the change in height may not be detected.

Therefore, in this embodiment, it is determined that the solid object is changed since the isolation region 1102 is in contact with the isolation region 1101 detected in the preceding frame in step S803. In response to the determination, the updating unit 109 initializes the operation surface corresponding to a portion of the solid object in step S414. A background image c obtained by initializing the solid object portion is used as three-dimensional positional information of the operation surface in a next stage. In FIG. 11C, an isolation region is not detected as a result of a subtraction of the background image c from the input image c, and therefore, the background image c is maintained. That is, a background image d is the same as the background image c. In a stage of FIG. 11D, when the user releases the hand again, an isolation region 1104 is detected from a subtraction of the background image d from an input image d and is specified as a solid object.

As described above, when it is determined whether the solid object has been moved in the xy plane in accordance with change of a height in the solid object region in step S802, even if a strict value is set to the predetermined rate P, a movement having a speed lower than the threshold value is not detected. As a result, a residual image portion is detected as a solid object region. Therefore, in this embodiment, in step S803, a process of determining whether the region corresponds to a residual image in accordance with positions of solid object regions detected in consecutive two frames and initializing the operation surface in the residual image portion is performed. By this, a solid object actually existing is detected and operation surface information may be reliably defined. Furthermore, if a movement of a certain solid object is to be determined only in step S803, when the solid object is small or the solid object is moved fast, the solid objects included in two consecutive frames are separated from each other which may cause misdetection. To address the problem described above, in this embodiment, a movement of the solid object is detected in both of the processes in steps S802 and step S803. However, depending on a condition of a frame rate or the like, one of the processes in step S802 and step S803 may be omitted.

Furthermore, to utilize the process in step S803 when a change of the solid object region is determined is effective for appropriately updating information on the operation surface not only in a case where the solid object is moved but also in a case where a shape of the solid object is changed.

Figure 12A:
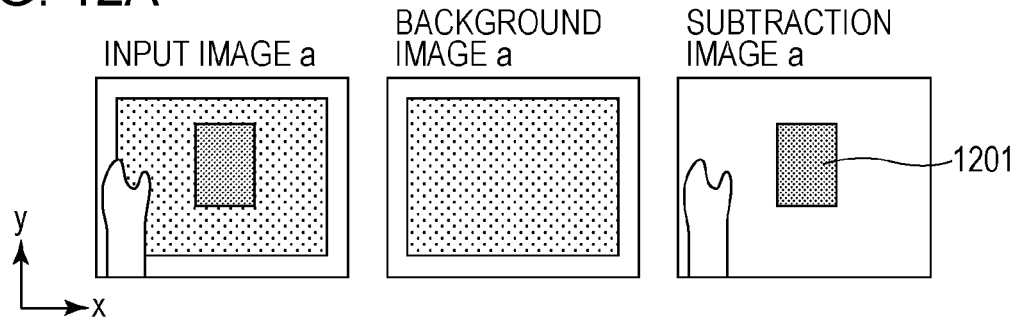
FIGS. 12A to 12D are diagrams illustrating an image process performed when a solid object is mounted on another solid object which has already been disposed in an overlapping manner according to the first embodiment.
Figure 12B:
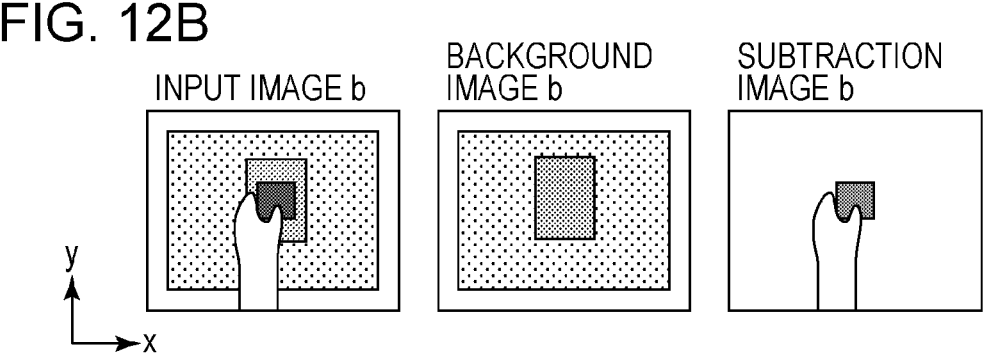
Figure 12C:
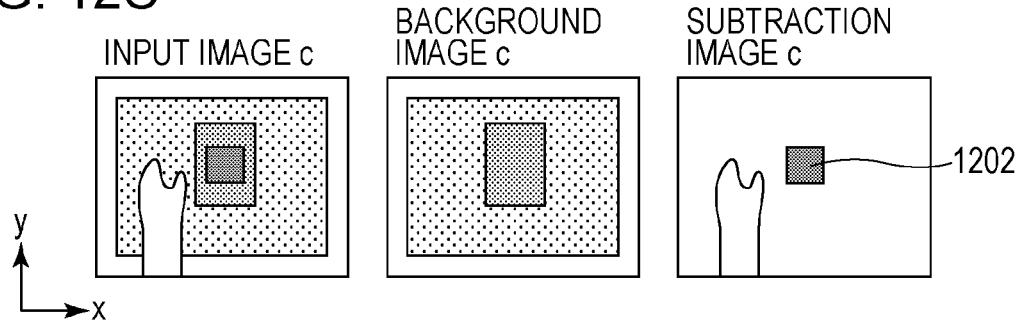
Figure 12D:
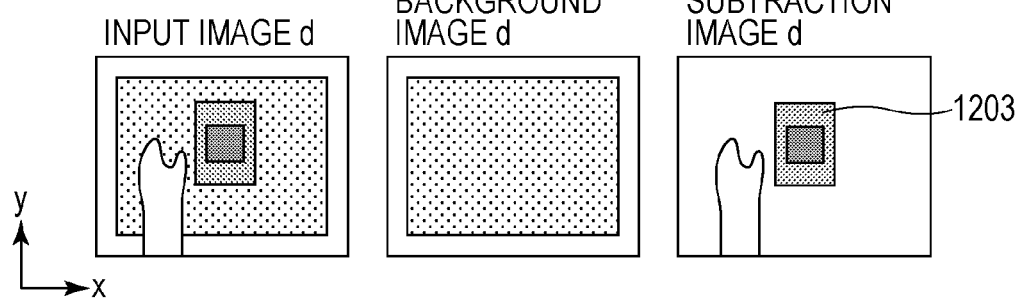

FIGS. 12A to 12D are diagrams illustrating an image process performed when a solid object is overlapped on another solid object which has already been mounted. In FIGS. 12A to 12D, a status change will be described as below. The user inserts a first solid object in an operation area and releases the hand as illustrated in FIG. 12A, the user places a second solid object on the first solid object as illustrated in FIG. 12B, the user releases the hand again as illustrated in FIG. 12C, and operation surface information is finally updated as illustrated in FIG. 12D.

In FIG. 12A, an isolation region 1201 which is not in contact with an isolation determination boundary in a subtraction image a is specified as a solid object in step S406 in accordance with a subtraction of a background image a in an initial state from an input image a. By this, in step S408, the isolation region 1201 is synthesized with the background image a, and the background image serving as information on a height of the operation surface is updated to a background image b illustrated in FIG. 12B. In FIG. 12B, a movement region extracted by a background subtraction of the synthesized background image b from the input image b does not include an isolation region (No in step S404). Furthermore, the movement region does not include a shape of the hand in a pointing posture (No in step S409), the process returns to step S401. In FIG. 12C, an isolation region 1202 is detected in a subtraction image c as a solid object in step S406 by a background subtraction of the synthesized background image c (which is the same as the background image b) from an input image c. Here, the region 1201 is detected as a solid object region within a predetermined past period of time (a period of time corresponding to three frames, for example) (Yes in step S801). Since the region 1202 is included in the region 1201 (Yes in step S803), it is determined that the solid object region is changed in step S804. Accordingly, information on the operation surface in the portion in which the isolation region is detected is initialized and a background used when a background subtraction is to be calculated next is updated to the background d. In FIG. 12D, the first solid object and the second solid object are integrally detected as illustrated by the subtraction image d by a background subtraction of the background image d from the input image d, a solid object region 1203 is newly detected, and the background image is updated.

Figure 13A:
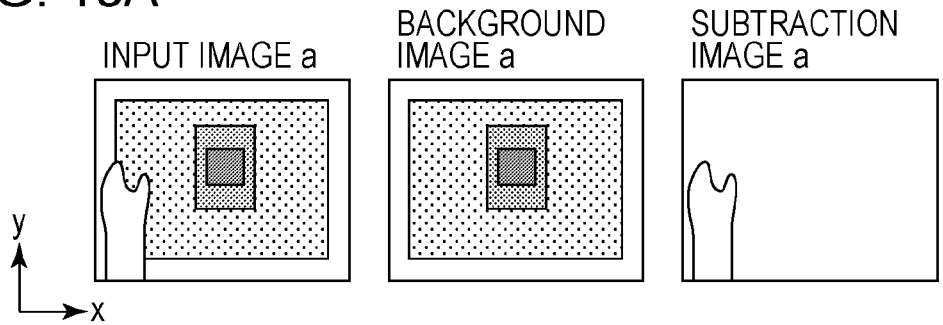
FIGS. 13A to 13D are diagrams illustrating an image process performed when one of two overlapped solid objects which is disposed on an upper side is removed according to the first embodiment.
Figure 13B:
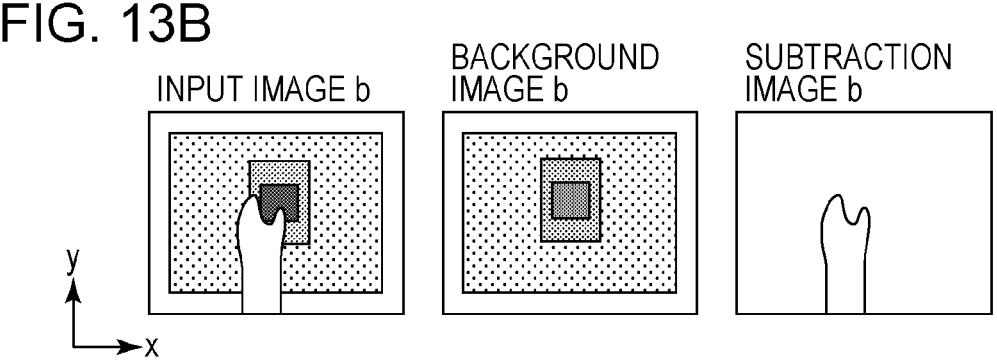
Figure 13C:
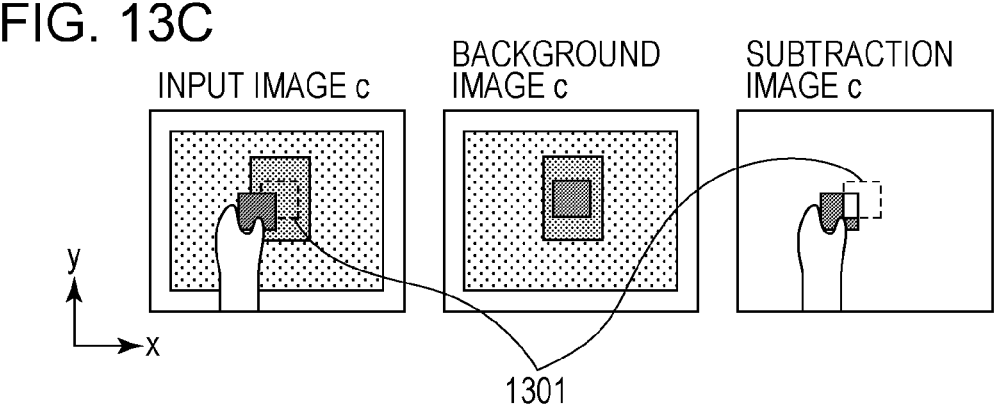
Figure 13D:
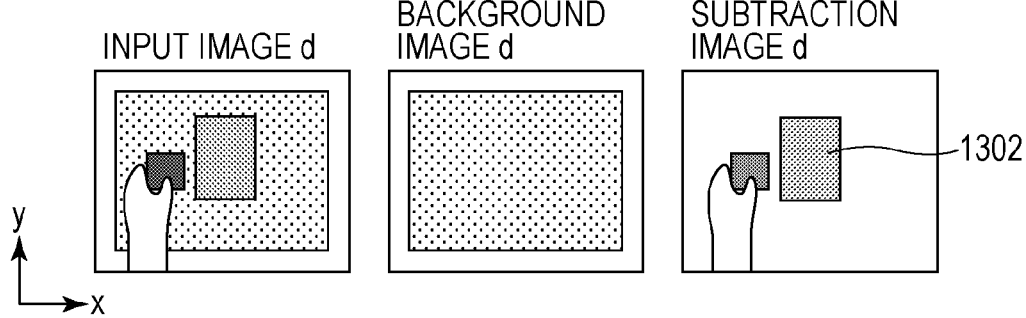

Furthermore, FIGS. 13A to 13D are diagrams illustrating an image process performed when one of two overlapped solid objects which is disposed on an upper side is removed. FIGS. 13A to 13D represent status change subsequently obtained after the status of FIG. 12D. In FIGS. 13A to 13D, the status change is described as follows. The user releases the hand from the first and second solid objects as illustrated in FIG. 13A, the user touches the second solid object to remove the second solid object as illustrated in FIG. 13B, the user lifts the second solid object as illustrated in FIG. 13C, and the user separates the second solid object from the first solid object as illustrated in FIG. 13D. A background image a of FIG. 13A is obtained after the update performed by the process in FIG. 12D. An isolation region is not detected as a result of a subtraction of the background image a from an input image a. Although the user's hand is overlapped on the solid object region in FIG. 13B, an isolation region is not detected as a result of a subtraction of a background image b from an input image b since the solid object is included in the background image b (which is the same as the background image a). The user shifts a position of the second solid object as illustrated by an input image c of FIG. 13C. Accordingly, a movement region in which the hand and a portion of the second solid object are integrated is detected by a background subtraction between the input image c and a background image c (which is the same as the background image b). Here, a region 1301 represents a portion in which a height is reduced in the solid object region lately detected (corresponding to the region 1203 of FIG. 12D). A rate of the region 1301 to the region 1203 is equal to or larger than a predetermined rate P % (Yes in step S802) and the region 1203 and the region 1301 are in contact with each other (Yes in step S803), and therefore, it is determined that the solid object region is changed in step S804. Accordingly, the background image is initialized and the background image d is used for a background subtraction in FIG. 13D. In FIG. 13D, a solid object region 1302 corresponding to the first solid object is detected by a background subtraction between an input image d and the background image d, and then, the background image is updated. Note that the process in step S802 may be altered such that an isolation region is detected when the region 1301 corresponding to a change portion of the second solid object is separated from the movement region including the hand (which is not isolated) before the process proceeds to step S803, and thereafter, a change may be determined by a result of a determination as to whether the region 1301 is in contact with the preceding solid object region 1203.

As described above, in this embodiment, when a shape of the operation surface is changed by overlapping a plurality of solid objects or by removing a solid object, the operation surface is initialized once, and thereafter, a height of the operation surface is obtained again when a solid object region is isolated. In this way, when a height of a background of a portion which is highly likely to be a residual image of a solid object is reduced to a height of a flat plate in an input image, misdetection of a touch operation caused when the user's hand is inserted into a space which no longer includes the solid object may be reduced.

Figure 14A:
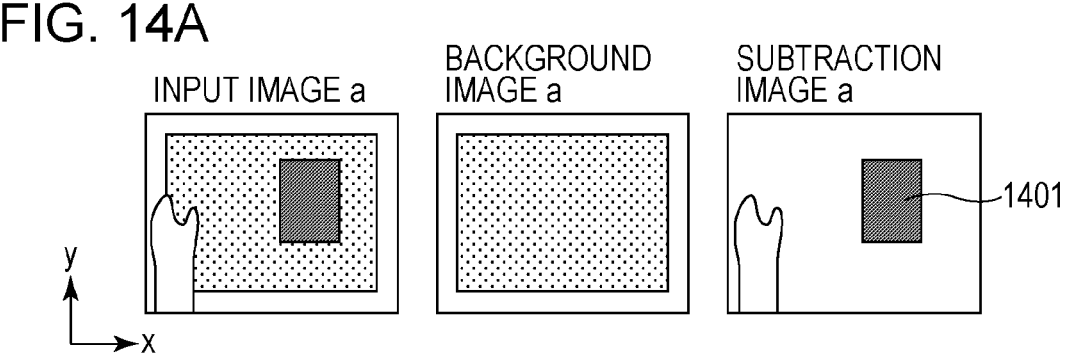
FIGS. 14A to 14D are diagrams illustrating an image process performed when a region of a solid object which has already been mounted is enlarged according to the first embodiment.
Figure 14B:
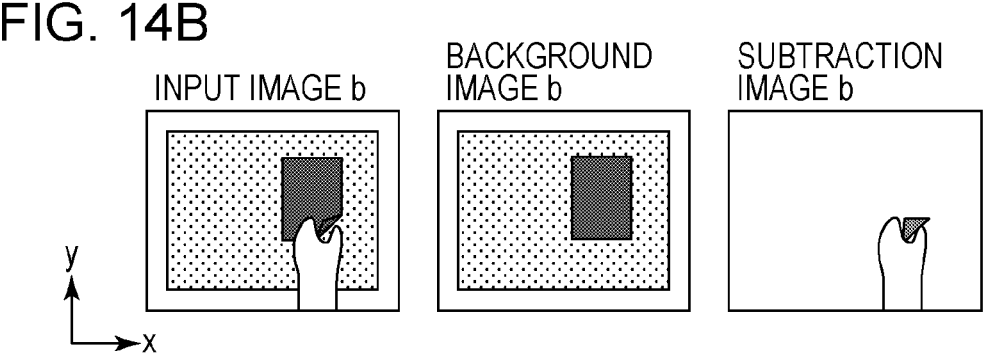
Figure 14C:
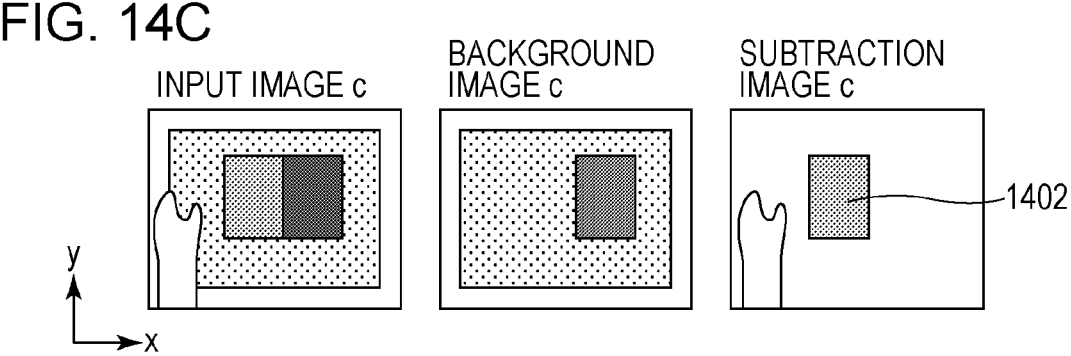
Figure 14D:
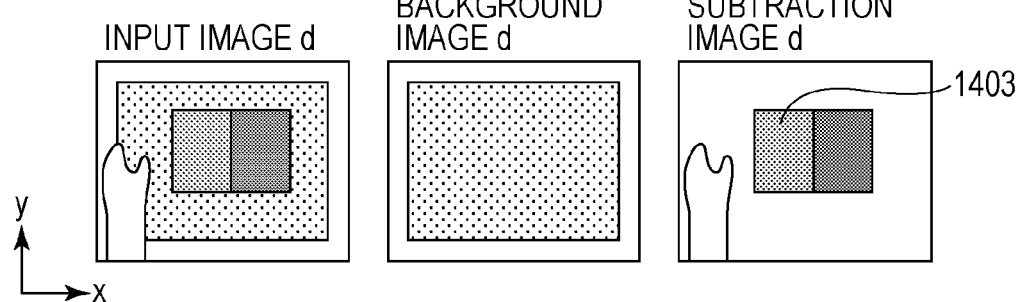

Next, FIGS. 14A to 14D are diagrams illustrating an image process performed when a region of a solid object which has been mounted is enlarged in detail. In FIGS. 14A to 14D, a status change will be described as below. The user inserts a book having a certain thickness in an operation area and releases the hand as illustrated in FIG. 14A, the user starts opening the book as illustrated in FIG. 14B, the user opens the book and releases the hand as illustrated in FIG. 14C, and operation surface information is finally updated as illustrated in FIG. 14D.

An input image a of FIG. 14A is obtained when a solid object is placed, and a background image a is an operation surface image stored in the image processing apparatus 100 at this time. A subtraction image a of FIG. 14A is a detection image of a movement region extracted by the movement region extraction unit 102 from the input image a. In the subtraction image a, the region specifying unit 107 detects an isolation region 1401 which is not in contact with an isolation determination boundary as a solid object. In FIG. 14A, the isolation region 1401 which is not in contact with the isolation determination boundary in the subtraction image a is specified as a solid object in accordance with a background subtraction of the background image a in an initial state from the input image a. By this, the background image is updated to a background image b of FIG. 14B. In FIG. 14B, a movement region extracted by a background subtraction of the synthesized background image b from an input image b does not include an isolation region. In a subtraction region b, the user's hand and a portion of the book which is lifted to be opened are integrally detected as the movement region. In FIG. 14C, a solid object region 1402 is detected in a subtraction image c by a background subtraction of a background image c (which is the same as the background image b) from an input image c. Since the solid object region 1402 is in contact with the solid object region 1401 which is previously detected (Yes in step S803), it is determined that the solid object region is changed. In response to the determination, the updating unit 109 initializes an operation surface image as illustrated by a background image d of FIG. 14D. In FIG. 14D, a solid object region 1403 corresponding to the entire book is detected in a subtraction image d by a background subtraction of the background image d from an input image d. In a state in which a state of the book is changed from a closed state to an opened state, the book is newly synthesized as a portion of the operation surface and the background image is updated.

Figure 15A:
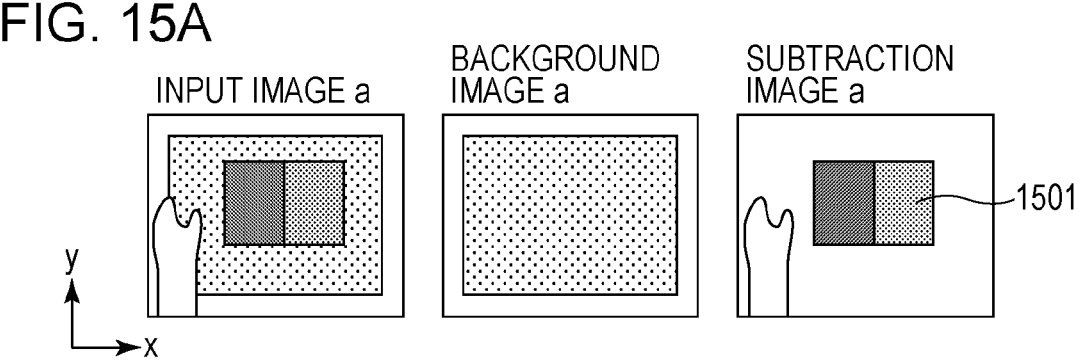
FIGS. 15A to 15D are diagrams illustrating an image process performed when a region of a solid object which has already been mounted is reduced according to the first embodiment.
Figure 15B:
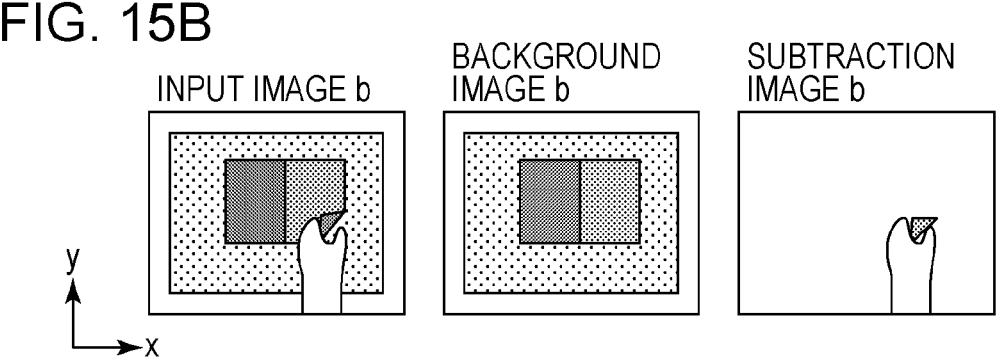
Figure 15C:
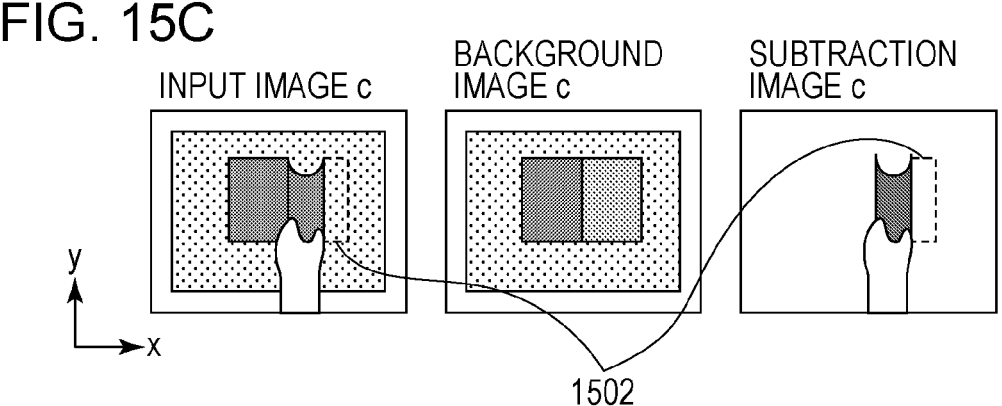
Figure 15D:
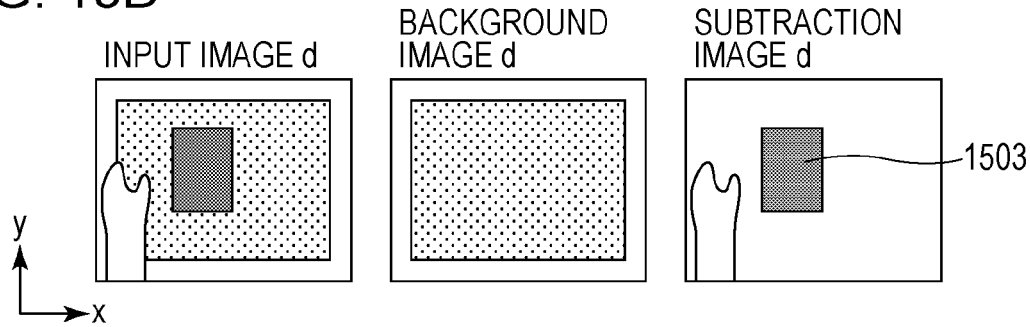

Furthermore, FIGS. 15A to 15D are diagrams illustrating an image process performed when a region of a solid object which has been mounted is reduced in detail. In FIGS. 15A to 15D, a status change will be described as below. The user places an opened book in an operation area as illustrated in FIG. 15A, the user starts turning over a page of the book so as to close the book as illustrated in FIG. 15B, the user is closing the book as illustrated in FIG. 15C, and the user closes the book and releases the hand from the book as illustrated in FIG. 15D. A solid object region 1501 is detected in a subtraction image a by a subtraction of the background image a from an input image a. By this, the background image is updated to a background image b of FIG. 15B and the user may perform a touch operation on the book. In FIG. 15B, a movement region which integrally includes the user's hand which is turning over a page and a portion of the book which is lifted is extracted from a subtraction image b by a subtraction of the background image b from an input image b, and an isolation region is not detected. In FIG. 15C, a movement region is detected in a subtraction image c by a background subtraction of a background image c (which is the same as the background image b) from an input image c. A region 1502 defined by a dotted line corresponds to a portion of the solid object region 1501 previously detected. The portion has a height lower than a height of a solid object. Since a rate of the region 1502 to the isolation region 1501 reaches a predetermined rate P % (Yes in step S802) and the region 1502 and the isolation region 1501 are in contact with each other (Yes in step S803), it is determined that the solid object region is changed in step S804. As with the case of FIGS. 13A to 13D, the process using the threshold value P % of the rate may be replaced by a process of determining whether an isolation region detected when the region 1502 is separated from a movement region is in contact with a solid object region previously detected. Since the solid object region is changed, three-dimensional positional information of the operation surface of the solid object portion is initialized, and the background image is updated to a background image d of FIG. 15D. In FIG. 15D, a solid object region 1503 is detected by a background subtraction of the background image d from an input image d, and the background image is updated. Since the background image represents information on a height of the operation surface, as a result of the updating, the image processing apparatus 100 may accept a touch operation on the book.

As described above, in this embodiment, a region which is isolated in a movement region extracted by the background subtraction method is detected in an operation area and a three-dimensional shape of the region is synthesized with a three-dimensional shape of the operation surface. By this, not only a touch operation on the operation surface provided in advance but also a touch operation on a solid object arbitrarily inserted into the operation area by the user may be recognized. Furthermore, since the background subtraction method is performed in terms of range information, even when an object existing in a foreground and a background are not moved, the object existing in the foreground may be reliably extracted as a movement region. Furthermore, in a case where a change occurs when a solid object which has been detected is moved or a shape of the solid object is changed, three-dimensional positional information on a portion corresponding to the solid object in the operation surface is initialized and a background is updated when the change is completed. By this, misdetection of a touch operation affected by a shape of the operation surface obtained before the change may be reduced and a touch operation suitable for the latest shape of the solid object may be detected.

In the first embodiment, the case where the user's hand and the fingertip of the user's hand are registered as a recognition target as examples of an instruction object is described. However, this embodiment is applicable to a case where an operation device, such as a pointing stick or a stylus pen, is used, for example. In this case, the object identification unit 103 determines whether a movement region corresponds to an object having a predetermined thickness, a predetermined acute angle, or a predetermined shape in step S409 in the flowchart of FIG. 4, and the operation position specifying unit 104 specifies a tip portion of the operation device as an operation position in step S410.

Furthermore, as described above, an operation detected by the recognition unit 106 is not limited to a touch on the operation surface and any operation may be detected. Since the height of the operation surface is updated in accordance with the solid object in the present invention, a more excellent effect may be attained when an operation changed depending on a height from the operation surface is recognized. For example, this embodiment is applicable to a case where a height from the operation surface is obtained when an operation performed for changing a size or a shape of a displayed UI in accordance with the height from the operation surface is recognized. Furthermore, in the example of the tabletop interface illustrated in FIGS. 2A and 2B in this embodiment, the relationship between the three-dimensional positional information on the operation surface and the three-dimensional position of the operation position is determined by the threshold value of the height from the operation surface. However, the present invention is applicable to a system using a white board or a wall as an operation surface, and a z axis may have an angle relative to a perpendicular direction instead of a height direction. Note that the z axis is a coordinate axis in a dominant direction of distances from the range image sensor 116 to points in the operation area. In this case, when detecting a change of the isolation region in step S802, the change determination unit 108 detects a change of a position of a partial region in a direction far from (or near to) the range image sensor 116 instead of a reduction in height of the partial region.

According to the first embodiment, the image processing apparatus 100 obtains a three-dimensional shape of the operation surface in accordance with the range image captured by the range image sensor 116. On the other hand, as a second embodiment, a case where, even when a range in which the range image sensor 116 may not obtain range information exists in a portion of a solid object, an operation on the region is enabled will be described. Appearance, a hardware configuration, and a functional configuration of an information processing system according to the second embodiment are the same as those of the first embodiment described with reference to FIGS. 1A, 1B, 2A, and 2B, and therefore, reference numerals the same as those of the first embodiment are assigned and detailed descriptions thereof are omitted.

Figure 16A:
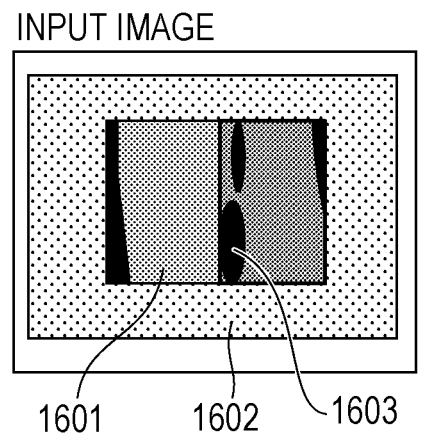
FIGS. 16A and 16B are diagrams illustrating an image process performed when range information of a portion of a solid object is not detected according to a second embodiment.
Figure 16B:
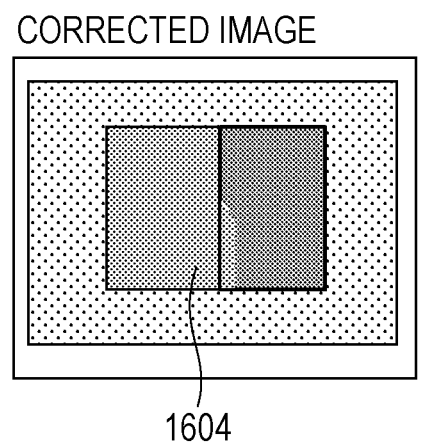

A region in which positional information is not reliably obtained may be generated in a portion of a range image serving as an input image due to a unique characteristic of a range image sensor 116 (infrared light, stereo camera, or the like). FIGS. 16A and 16B are diagrams illustrating an image process performed when range information of a portion of a solid object is not detected in detail. FIG. 16A is a diagram illustrating an input image in this case. In FIG. 16A, a region 1601 represents an isolation region detected in the input image and a region 1602 represents a range of a flat plate 201 serving as an operation surface in an initial state. Furthermore, a region 1603 is included in a movement region but range information of the region 1603 may not be obtained by the range image sensor 116. Since the range information of the region 1603 is not obtained, when an updating unit 109 performs update so that the operation surface is updated to the region 1603, any operation is not performed in the region 1603.

Figure 17:
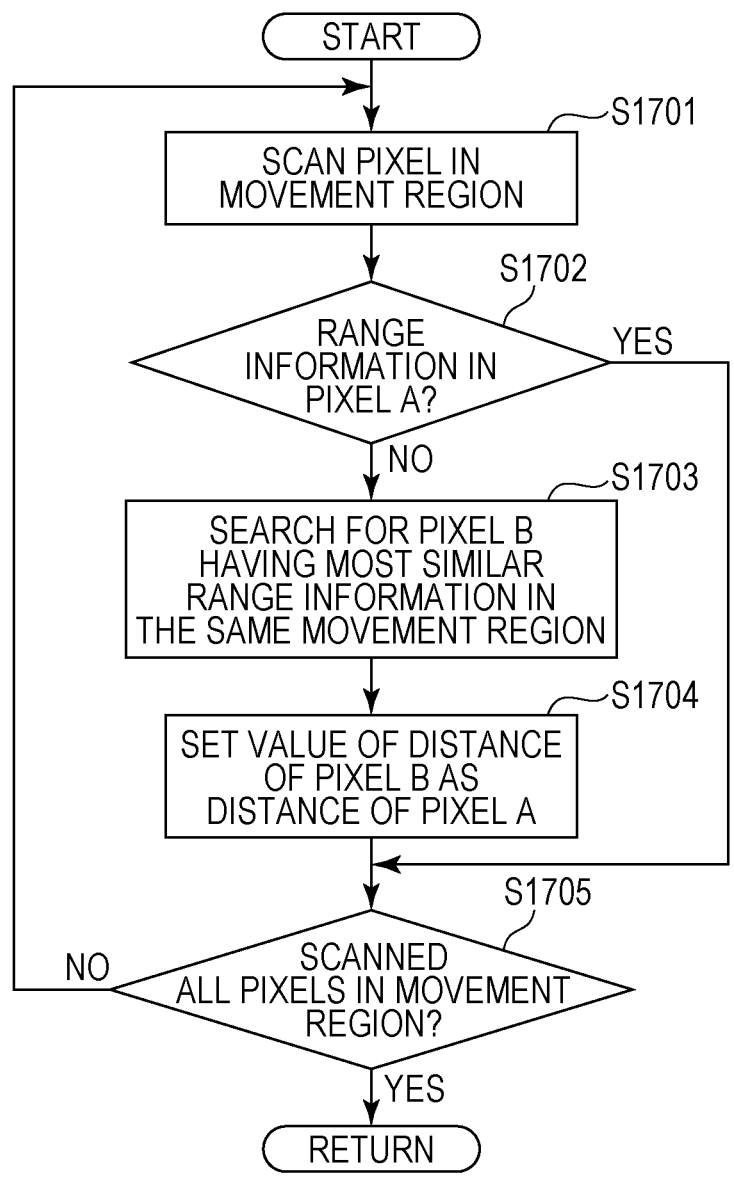
FIG. 17 is a flowchart illustrating a process of interpolating range information executed by the image processing apparatus according to the second embodiment.

FIG. 17 is a flowchart illustrating an interpolation process for interpolating the range information of the region 1603 which does not include the range information. In the second embodiment, a process of the flowchart of FIG. 17 is started after a movement region extraction unit 102 detects a movement region. First, in step S1701, the movement region extraction unit 102 selects one of pixels in an input image corresponding to the detected movement region. In step S1702, the movement region extraction unit 102 determines whether a pixel A which is scanned has range information. When it is determined that the pixel A has range information (Yes in step S1702), the process proceeds to step S1705. When it is determined that the pixel A does not have range information (No in step S1702), the process proceeds to step S1703. In step S1703, the movement region extraction unit 102 searches for a pixel B which has range information and which is the most similar to the pixel A in the movement region including the pixel A. In step S1704, a value of a distance of the pixel B is set to a value of a distance of the pixel A. In step S1705, it is determined whether all the pixels included in the movement region have been scanned, and when an unprocessed pixel is detected, the process returns to step S1701 and the unprocessed pixel is scanned. When an unprocessed pixel is not detected, the process is terminated and the process proceeds to step S404 in the main flow.

An image obtained by performing the interpolation process described above is illustrated in FIG. 16B. A movement region 1604 stores range information for a region 1603 which does not include range information. A region specifying unit 107 detects an isolation region in accordance with the movement region 1604 and the updating unit 109 synthesizes an operation surface image so that a region in which range information thereof is not obtained in a solid object may be operated.

According to the present invention, three-dimensional positional information of an operation target surface may be updated in accordance with a user's operation in a system in which the operation target surface may be deformed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-141806, filed Jul. 9, 2014, which is hereby incorporated by reference herein in its entirety.

What is claimed is:

1. An information processing apparatus comprising:
an image obtaining unit configured to obtain a range image on which depth information in a space including an operation surface as a portion of a background is reflected;
an extraction unit configured to extract one or more regions corresponding to one or more objects included in a foreground portion relative to the operation surface from the range image obtained by the image obtaining unit in accordance with the depth information reflected on each pixel in the range image, the one or more objects existing in the space;
a region specifying unit configured to specify an isolation region which is not in contact with a boundary line which defines a predetermined closed region in the range image from among the one or more regions extracted by the extraction unit; and
a recognition unit configured to recognize an adjacency state of a predetermined instruction object relative to an object mounted on the operation surface in accordance with the depth information reflected on the isolation region in the range image.

2. The information processing apparatus according to claim 1, wherein range image has pixel values representing depths to an object in the space from a range image sensor as the range image.

3. The information processing apparatus according to claim 2,
wherein the extraction unit extracts a region including an image of the object existing in the foreground of the operation surface by subtracting depth information representing the background of the space from the depth information reflected on the range image obtained by the image obtaining unit.

4. The information processing apparatus according to claim 3, further comprising:
an updating unit configured to update the depth information representing the background of the space using the depth information reflected on the isolation region specified by the region specifying unit,
wherein the image obtaining unit repeatedly obtains the range image, and
wherein the recognition unit determines whether the adjacency state of the predetermined instruction object relative to the operation surface or an object mounted on the operation surface is regarded as a touch state, using the depth information reflected on the region including an image of the predetermined instruction object among the regions extracted by the extraction unit from a range image newly obtained by the image obtaining unit and the depth information representing the background of the space updated by the updating unit.

5. The information processing apparatus according to claim 4,
wherein the updating unit updates information on the background by synthesizing the depth information reflected on the isolation region among the regions extracted by the extraction unit with the depth information of the operation surface.

6. The information processing apparatus according to claim 4,
wherein the operation surface corresponds to a table surface in a tabletop interface system, and the updating unit determines the isolation region as a region corresponding to a solid object mounted on the table and updates depth information representing a height of the operation surface so that the table surface and the solid object are included in an updated operation surface.

7. The information processing apparatus according to claim 4,
wherein the updating unit initializes, in a case where the depth information reflected on the isolation region specified by the region specifying unit is changed, depth information representing a portion corresponding to the isolation region in the depth information representing the background.

8. The information processing apparatus according to claim 7,
wherein the case where the depth information reflected on the isolation region is changed corresponds to a case where depth information reflected on the isolation region which is specified in a range image lastly obtained by the image obtaining unit is different from depth information reflected on the isolation region which is specified in the range image previously obtained.

9. The information processing apparatus according to claim 8, wherein the updating unit initializes, in a case where the depth information reflected on the isolation region is changed and the changed isolation region overlaps with an isolation region which is lately extracted before the change, depth information representing a portion corresponding to the isolation region in the depth information representing the background.

10. The information processing apparatus according to claim 1, wherein the boundary line which defines the predetermined closed region corresponds to a contour of the operation surface included in the range image.

11. The information processing apparatus according to claim 1, further comprising:
an interpolation unit configured to perform interpolation using depth information obtained from the isolation region in a case where depth information of a portion of the isolation region is not obtained from the range image obtained by the image obtaining unit.

12. The information processing apparatus according to claim 1, further comprising:
a position specifying unit configured to specify an operation position instructed by the predetermined instruction object in accordance with a shape of a region which is not the isolation region among the regions extracted by the extraction unit,
wherein the recognition unit recognizes an instruction in accordance with depth information of the operation position specified by the position specifying unit.

13. The information processing apparatus according to claim 12,
wherein the recognition unit detects a touch of the predetermined instruction object on the object mounted on the operation surface in a case where the depth information of the operation position specified by the position specifying unit and the depth information reflected on the isolation region specified by the region specifying unit represent that a distance from the predetermined instruction object to the object mounted on the operation surface is smaller than a predetermined distance.

14. The information processing apparatus according to claim 1,
wherein the image obtaining unit repeatedly obtains the range image,
wherein the recognition unit detects a touch of the predetermined instruction object on the object mounted on the operation surface in accordance with adjacency state between the predetermined instruction object and the object mounted on the operation surface represented by the depth information reflected on a region which is not the isolation region among the regions extracted from the range image lastly obtained and the depth information reflected on the isolation region specified in the range image previously obtained.

15. A method for controlling an information processing apparatus, comprising:
obtaining a range image in which depth information in a space including an operation surface as a portion of a background is reflected;
extracting one or more regions corresponding to one or more objects included in a foreground portion relative to the operation surface from the obtained range image in accordance with the depth information reflected on each pixel in the obtained range image, the one or more objects existing in the space;

specifying an isolation region which is not in contact with a boundary line which defines a predetermined closed region in the range image from among the one or more extracted regions; and recognizing an adjacency state of a predetermined object relative to an object mounted on the operation surface in accordance with the depth information reflected on the isolation region in the obtained range image.

16. The information processing apparatus according to claim 1, wherein, from among the one or more regions extracted by the extraction unit from the range image, the isolation region which is not in contact with the boundary line corresponds to a region including an image of an object other than the predetermined instruction object, and a region which is in contact with the boundary line and is not the isolation region corresponds to the region including an image of the predetermined instruction object.

17. The information processing apparatus according to claim 4, wherein the region including the image of the predetermined instruction object among the regions extracted by the extraction unit corresponds a region in contact with the boundary line which defines the predetermined closed region in the range image newly obtained by the image obtaining unit after the depth information representing the background of the space is updated.

18. The information processing apparatus according to claim 6, further comprising:

a position specifying unit configured to specify an operation position instructed by the predetermined instruction object in accordance with a shape of a region which is not the isolation region from among the regions extracted by the extraction unit, wherein the recognition unit detects a touch of the predetermined instruction object on the updated operation surface in a case where difference between depth information of the operation position specified by the position specifying unit and depth information of a position corresponding to the operation position on the updated operation surface is smaller than a predetermined value.

19. The information processing apparatus according to claim 1, wherein the depth information reflected on each pixel in the range image is information indicating a distance from a range image sensor to a surface of an object in a space over the operation surface.

* * * * *